US009921325B2

(12) United States Patent
Hegna et al.

(10) Patent No.: US 9,921,325 B2
(45) Date of Patent: Mar. 20, 2018

(54) WAVEFIELD SEPARATION BASED ON A MATCHING OPERATOR BETWEEN SENSOR RESPONSES IN MULTI-COMPONENT STREAMERS

(71) Applicant: PGS Geophysical AS, Oslo (NO)

(72) Inventors: Stian Hegna, Hovik (NO); Tilman Kluver, Sande (NO)

(73) Assignee: PGS Geophysical AS, Oslo (NO)

( * ) Notice: Subject to any disclaimer, the term of this patent is extended or adjusted under 35 U.S.C. 154(b) by 594 days.

(21) Appl. No.: 14/571,656

(22) Filed: Dec. 16, 2014

(65) Prior Publication Data
US 2016/0170054 A1 Jun. 16, 2016

(51) Int. Cl.
G01V 1/36 (2006.01)
G01V 1/38 (2006.01)

(52) U.S. Cl.
CPC ........ *G01V 1/36* (2013.01); *G01V 2210/1293* (2013.01); *G01V 2210/1423* (2013.01); *G01V 2210/56* (2013.01)

(58) Field of Classification Search
CPC ............. G01V 1/36; G01V 2210/1423; G01V 2210/1293; G01V 2210/56
See application file for complete search history.

(56) References Cited

U.S. PATENT DOCUMENTS

| | | | | |
|---|---|---|---|---|
| 7,835,225 B2 * | 11/2010 | Sollner | ................ | G01V 1/3808 367/24 |
| 8,174,926 B2 * | 5/2012 | Kluver | ..................... | G01V 1/36 367/21 |
| 2008/0089174 A1 * | 4/2008 | Sollner | ................ | G01V 1/3808 367/21 |
| 2016/0170054 A1 * | 6/2016 | Hegna | ...................... | G01V 1/36 367/24 |
| 2016/0377756 A1 * | 12/2016 | Hegna | .................... | G01V 1/364 367/24 |

FOREIGN PATENT DOCUMENTS

| | | | | |
|---|---|---|---|---|
| EP | 3112907 A1 * | 1/2017 | ............. | G01V 1/364 |
| GB | 2535606 A * | 8/2016 | ............... | G01V 1/36 |

* cited by examiner

*Primary Examiner* — Daniel Pihulic

(57) ABSTRACT

This disclosure is directed to systems and methods of wavefield separation based on matching operators that represents the relationship between co-located pressure and particle motions sensors. A pressure wavefield and a particle motion wavefield emitted from a subterranean formation are measured using co-located pressure and particle motion sensors located along one or more streamers of a seismic data acquisition system. A matching operator that relates pressure sensor and particle motion sensor responses for co-located pressure and particle motion sensors is computed based on depth of the co-located pressure and particle motion sensors and on the measured pressure and particle motion wavefields. The matching operator and the measured pressure and particle motion wavefields may then be used to compute up-going and down-going wavefields.

31 Claims, 21 Drawing Sheets

US 9,921,325 B2

WAVEFIELD SEPARATION BASED ON A MATCHING OPERATOR BETWEEN SENSOR RESPONSES IN MULTI-COMPONENT STREAMERS

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged seismic sources. The acoustic signals travel down through the water and into the subterranean formation. At each interface between different types of rock or sediment of the subterranean formation a portion of the acoustic signal energy is refracted, a portion is transmitted, and a portion is reflected back toward the formation surface and into the body of water. A typical marine survey is carried out with a survey vessel that passes over the illuminated subterranean formation while towing elongated cable-like structures called streamers. The streamers may be equipped with a number of co-located, pressure and particle motion sensors that detect pressure and particle motion wavefields, respectively, associated with the acoustic signals reflected back into the water from the subterranean formation. The pressure sensors generate seismic data that represents the pressure wavefield and the particle motion sensors generate seismic data that represents the vertical particle motion wavefield. The survey vessel receives and records the seismic data generated by the sensors.

A wavefield that travels upward from the subterranean formation and is detected by the pressure or particle motion sensors is called an up-going wavefield, which alone may be used to compute a seismic image of the subterranean formation. However, the surface of the water acts as a nearly perfect acoustic reflector. As a result, the sensors also detect a down-going wavefield created by reflection of the up-going wavefield from the water surface. The down-going wavefield is essentially the up-going wavefield with a time delay that corresponds to the amount of time it takes for acoustic signals to travel up past the streamers to the water surface and back down to the streamers. The down-going wavefield combines with the up-going wavefield, resulting in recorded seismic data contaminated with unwanted down-going wavefield energy that creates "ghost" effects in seismic images of the subterranean formation computed from the seismic data. Typical seismic data processing techniques use both the pressure and particle motion wavefields to separate these into up-going and down-going wavefields. The up-going wavefields may be used to compute an image of a subterranean formation without the ghost effects caused by the down-going wavefield.

DETAILED DESCRIPTION

This disclosure is directed to systems and methods of wavefield separation based on matching operators that represents the relationship between co-located pressure and particle motions sensors. A pressure wavefield and a particle motion wavefield emitted from a subterranean formation are measured using co-located pressure and particle motion sensors located along one or more streamers of a seismic data acquisition system. The pressure and particle motion wavefields are transformed from the space-time ("s-t") domain to the frequency-wavenumber ("f-k") domain. In the frequency-wavenumber domain, a matching operator that relates pressure sensor and particle motion sensor responses for co-located pressure and particle motion sensors is computed based on depth of the co-located pressure and particle motion sensors and on the measured pressure and the measured particle motion wavefields. The matching operator and the measured pressure and particle motion wavefields may then be used to compute one of up-going pressure wavefield and up-going particle motion wavefield, which in turn, may be used in subsequent geophysical data processing to generate seismic images of a subterranean formation.

Figure 1A:
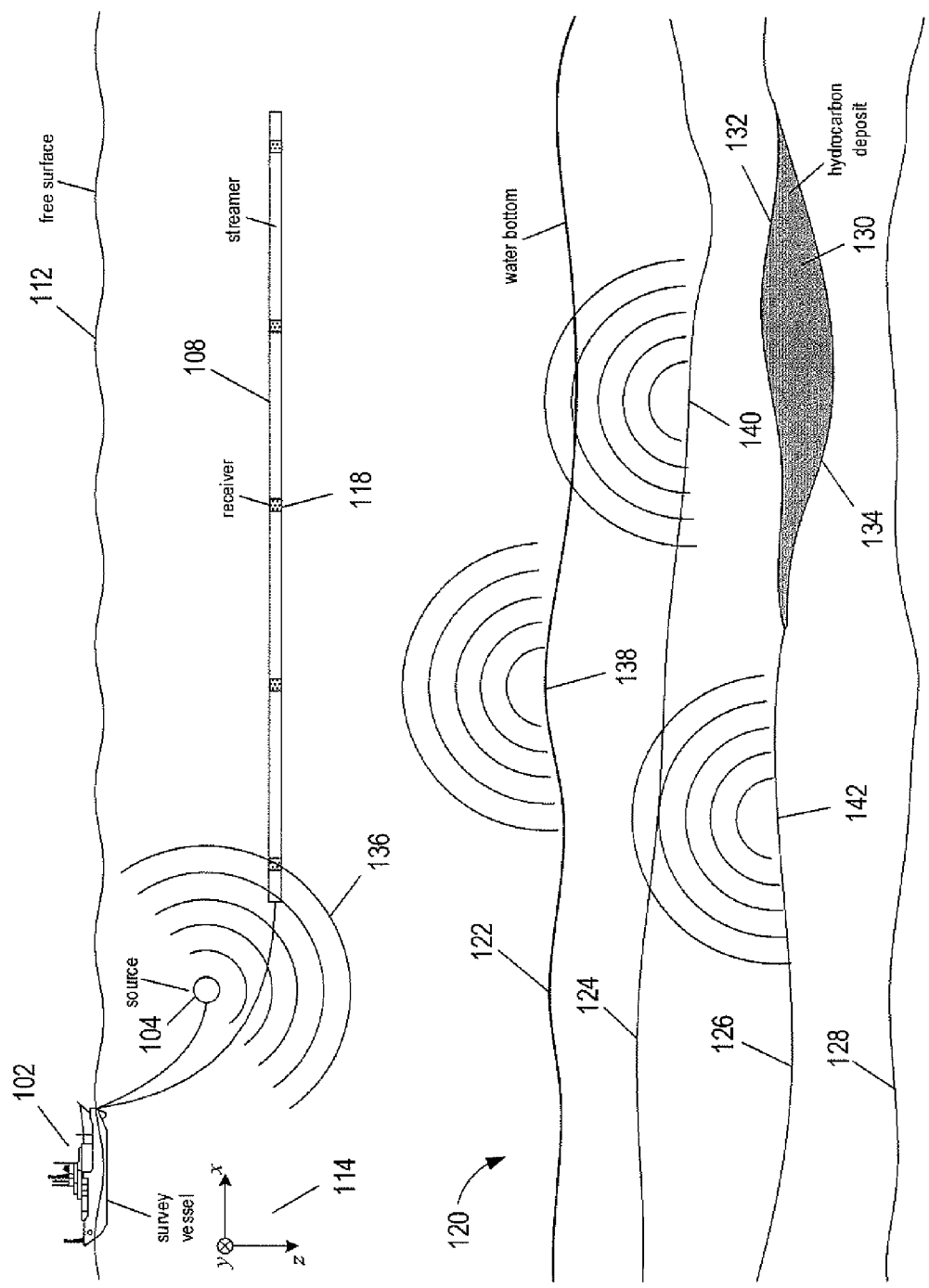
FIGS. 1A-1B show side-elevation and top views of an example seismic data acquisition system.
Figure 1B:
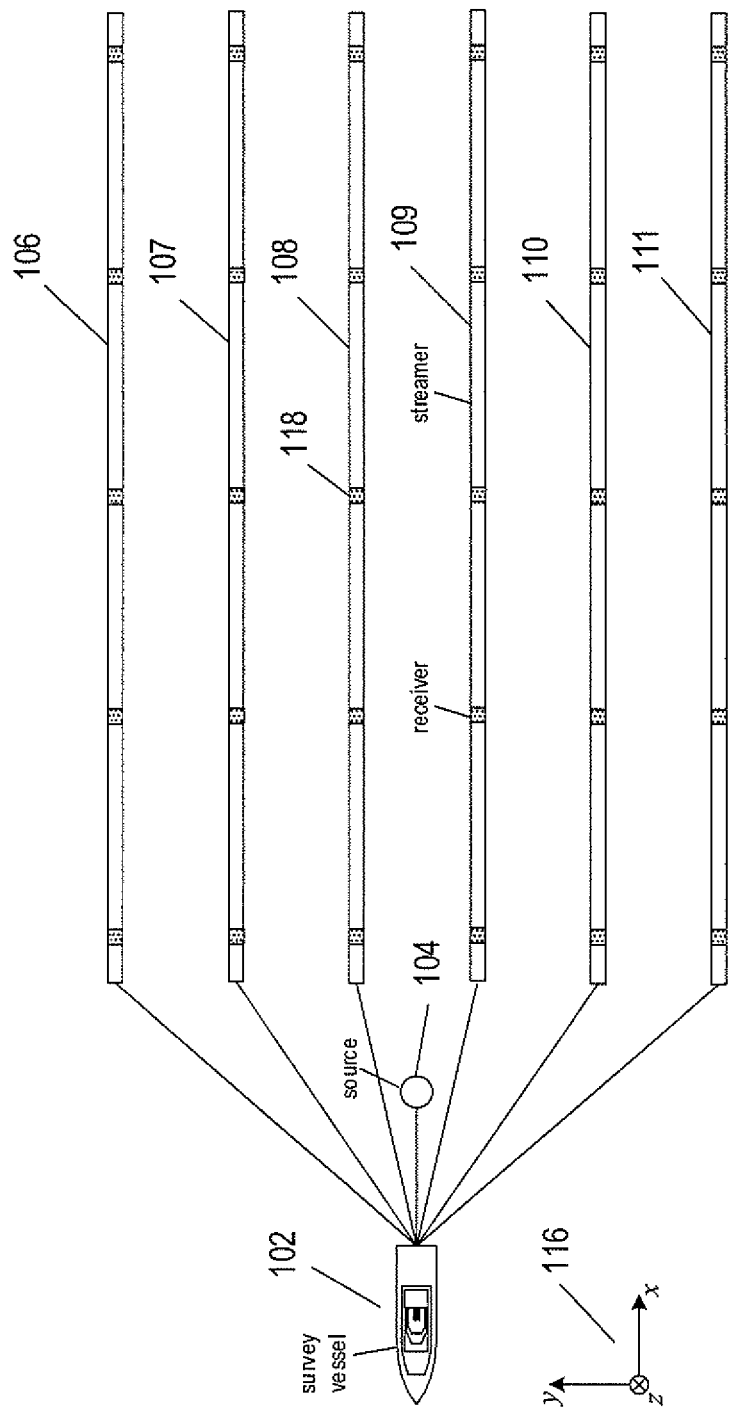

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 may be activated to produce an acoustic signal at spatial and/or temporal intervals. In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be spherical but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
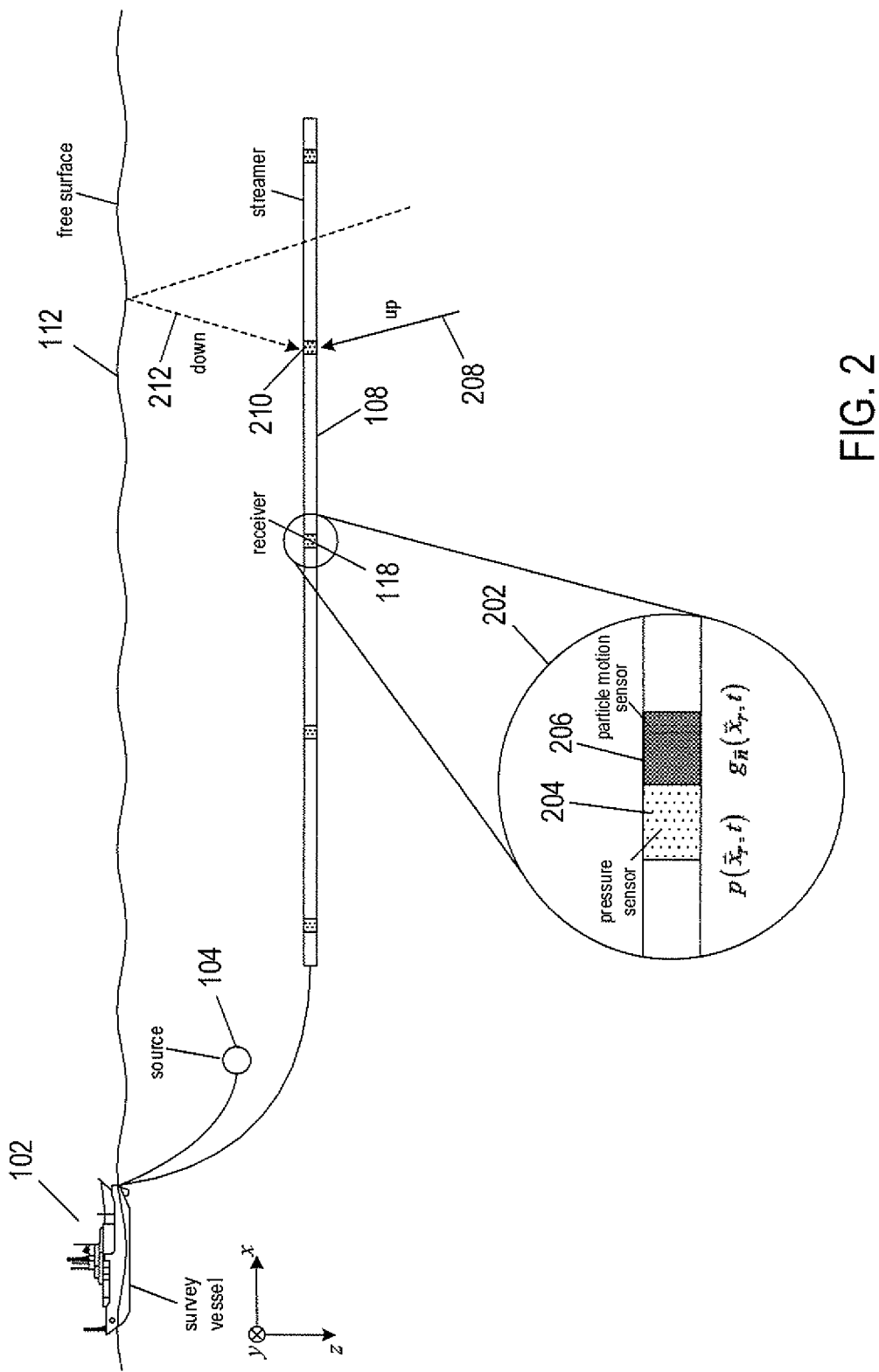
FIG. 2 shows a side-elevation view of marine seismic data acquisition system with a magnified view of a receiver.

Each receiver 118 may be multiple sensors composed of particle motion sensors that detects particle motion, velocities, or accelerations over time, and a pressure sensor that detects variations in water pressure over time, or a combination of particle motion and pressure sensors. FIG. 2 shows a side-elevation view of the marine seismic data acquisition system with a magnified view 202 of the receiver 118. In this example, the magnified view 202 reveals that the receiver 118 is composed of a pressure sensor 204 and a particle motion sensor 206. The pressure sensor may be, for example, a hydrophone. Each pressure sensor may measure changes in hydrostatic pressure over time to produce pressure data denoted by $p(\vec{x}_r, t)$, where $\vec{x}_r$ represents the Cartesian coordinates $(x_r, y_r, z_r)$ of a receiver, subscript r is a receiver index, and t represents time. The particle motion sensors may be responsive to water motion. In general, particle motion sensors detect particle motion in a specified direction and may be responsive to such directional displacement of the particles, velocity of the particles, or acceleration of the particles. A particle motion sensor that measures particle motion generates particle motion data denoted by $g_{\vec{n}}(\vec{x}_r, t)$. A particle motion sensor that means particle velocity (i.e., particle velocity sensor) generates particle velocity data denoted by $v_{\vec{n}}(\vec{x}_r, t)$. A particle motion sensor that measures particle acceleration (i.e., accelerometer) generates particle acceleration data denoted by $a_{\vec{n}}(\vec{x}_r, t)$. The data generated by one type of particle motion sensor may be converted to another type. For example, particle velocity data may be differentiated to obtain particle acceleration data, or particle acceleration data may be integrated to obtain particle velocity data.

The particle motion sensors are typically oriented so that the particle motion is measured in the vertical direction (i.e., $\vec{n}$ (0,0, z)) in which case $v_z(\vec{x}_r, t)$ is called the vertical velocity data and $a_z(\vec{x}_r, t)$ is called the vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the inline velocity data, $v_x(\vec{x}_r, t)$, and a particle motion sensor that measures the wavefield in the cross-line direction in order to obtain the cross-line velocity data, $v_y(\vec{x}_r, t)$.

Figure 3A:
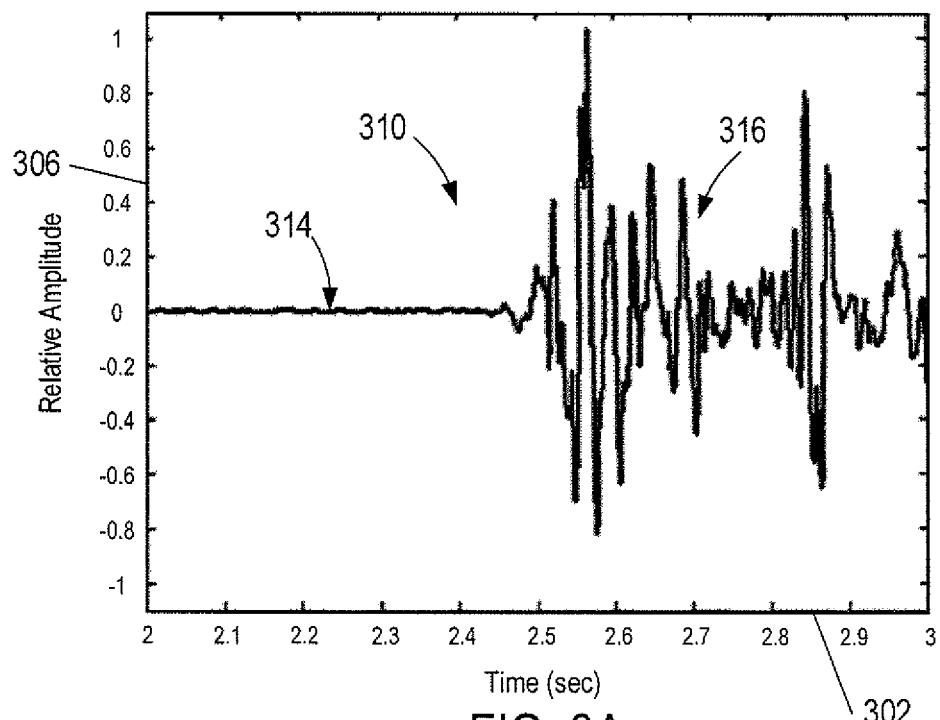
FIGS. 3A-3B show relative amplitude versus time plots of pressure data and vertical velocity data, respectively, generated by co-located pressure and particle motion sensors.
Figure 3B:
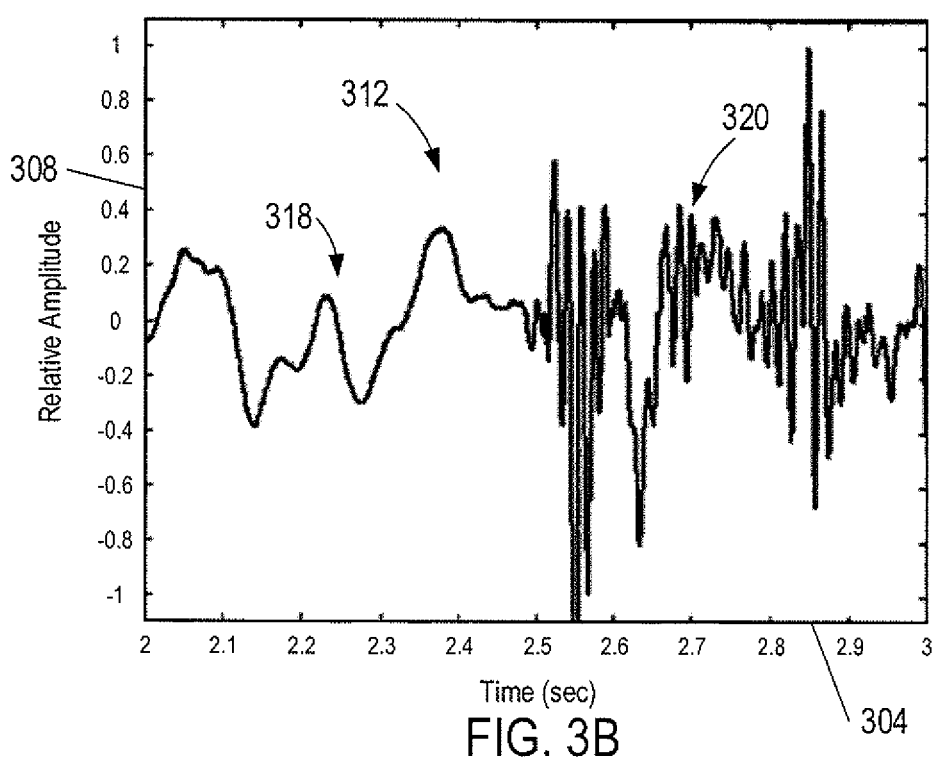

FIGS. 3A-3B show relative amplitude versus time plots of pressure data and vertical velocity data, respectively, generated by co-located pressure and particle motion sensors located about 13 meters below the free surface. Horizontal axes 302 and 304 represent the same time interval, and vertical axes 306 and 308 represent relative amplitude. In FIG. 3A, waveform 310 represents water pressure changes measured by the pressure sensor in response to an acoustic signal generated by a source. In FIG. 3B, waveform 312 represents the vertical particle velocity changes in the water measured by the particle motion sensor in response to the same acoustic signal. The waveform 310 exhibits a flat region 314 (i.e., approximately zero amplitude variation) and a rapidly varying region 316 that begin at about 2.45 sec, which corresponds to water pressure changes resulting from the acoustic signal. By contrast, the waveform 312 exhibits a slowly varying region 318 that switches to a rapidly varying region 320 at about 2.45 sec. The rapidly varying region 320 records water particle motion resulting from the acoustic signal.

As shown in FIG. 1B, the streamers 106-111 and the survey vessel 102 may include sensing electronics and data-processing facilities that allow seismic data generated by each receiver to be correlated with the time the source is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102 or transmitted from the survey vessel in real time. The pressure data and particle motion, velocity, or acceleration data represent pressure and particle motion wavefields and, therefore, may also be referred to as the pressure wavefield and particle motion, velocity, or acceleration wavefield, respectively.

Returning to FIG. 2, directional arrow 208 represents the direction of an up-going wavefield at the location of a receiver 210 and dashed-line arrow 212 represents a down-going wavefield produced by reflection of an up-going wavefield from the free surface 112 before reaching the receiver 210. In other words, the pressure wavefield is composed of an up-going pressure wavefield component and a down-going pressure wavefield component, and the particle motion wavefield is composed of an up-going wavefield component and a down-going wavefield component. The down-going wavefield, also called the "ghost wavefield," interferes with the pressure and particle motion data generated by the receivers and creates notches in the seismic data spectral domain.

Figure 4:
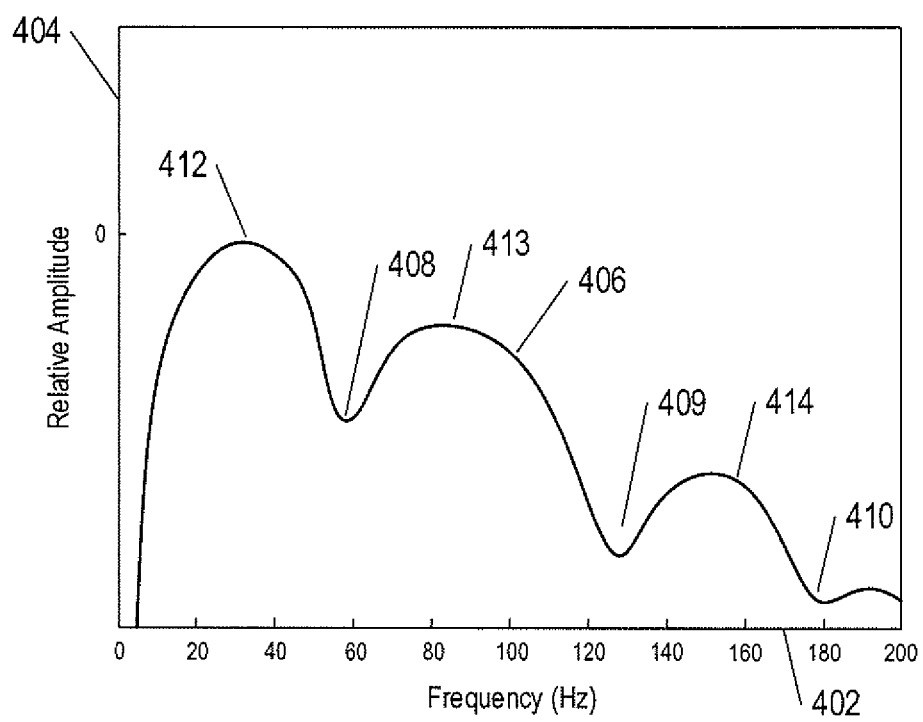
FIG. 4 shows a synthetic frequency spectrum for pressure data generated by a pressure sensor.

FIG. 4 shows a synthetic frequency spectrum for pressure data generated by a pressure sensor. Horizontal axis 402 represents frequencies, vertical axis 404 represents relative amplitude, and curve 406 represents the synthetic frequency spectrum. The interference between the up-going wavefield and the down-going wavefield varies with the depth of the source and the depth of the streamer. As shown in FIG. 4, the amplitude of certain frequencies are substantially decreased at the pressure sensor as represented by notches 408-410 and the amplitudes of other frequencies are increased as represented by peaks 412-414. The frequencies of the peaks and notches depend on the depth of the streamer. The peak frequencies are shifted toward lower values as streamer depth increases and shifted toward higher values as streamer depth decreases.

As explained above, each pressure sensor and particle motion sensor generates seismic data that may be stored in data-storage devices located onboard the survey vessel.

Each pressure sensor and particle motion sensor may include an analog-to-digital converter that converts time-dependent analog signals into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace is a recording of a subterranean formation response to acoustic energy that passes from an activated source, into the subterranean formation where a portion of the acoustic energy is reflected and/or refracted and ultimately detected by a sensor as described above. A trace records variations in a time-dependent amplitude that represents acoustic energy in the portion of the secondary wavefield measured by the sensor. In other words, each trace is a set of discrete time-dependent pressure or motion sensor amplitudes denoted by $$tr(r)=\{c_r(t_m)\}_{m=1}^M \quad (1)$$

where r is the receiver, trace, or channel index;
$c_r(t_m)$ is the amplitude of trace at time sample $t_m$; and
M is the number of time samples in the trace.

As explained above, the secondary wavefield typically arrives first at the receivers located closest to the sources. The distance from the sources to a receiver is called the "source-receiver offset," or simply "offset," which creates a delay in the arrival time of a secondary wavefield from a substantially horizontal interface within the subterranean formation. A larger offset generally results in a longer arrival time delay. The traces are collected to form a "gather" that can be further processed using various seismic data processing techniques in order to obtain information about the structure of the subterranean formation.

Figure 5:
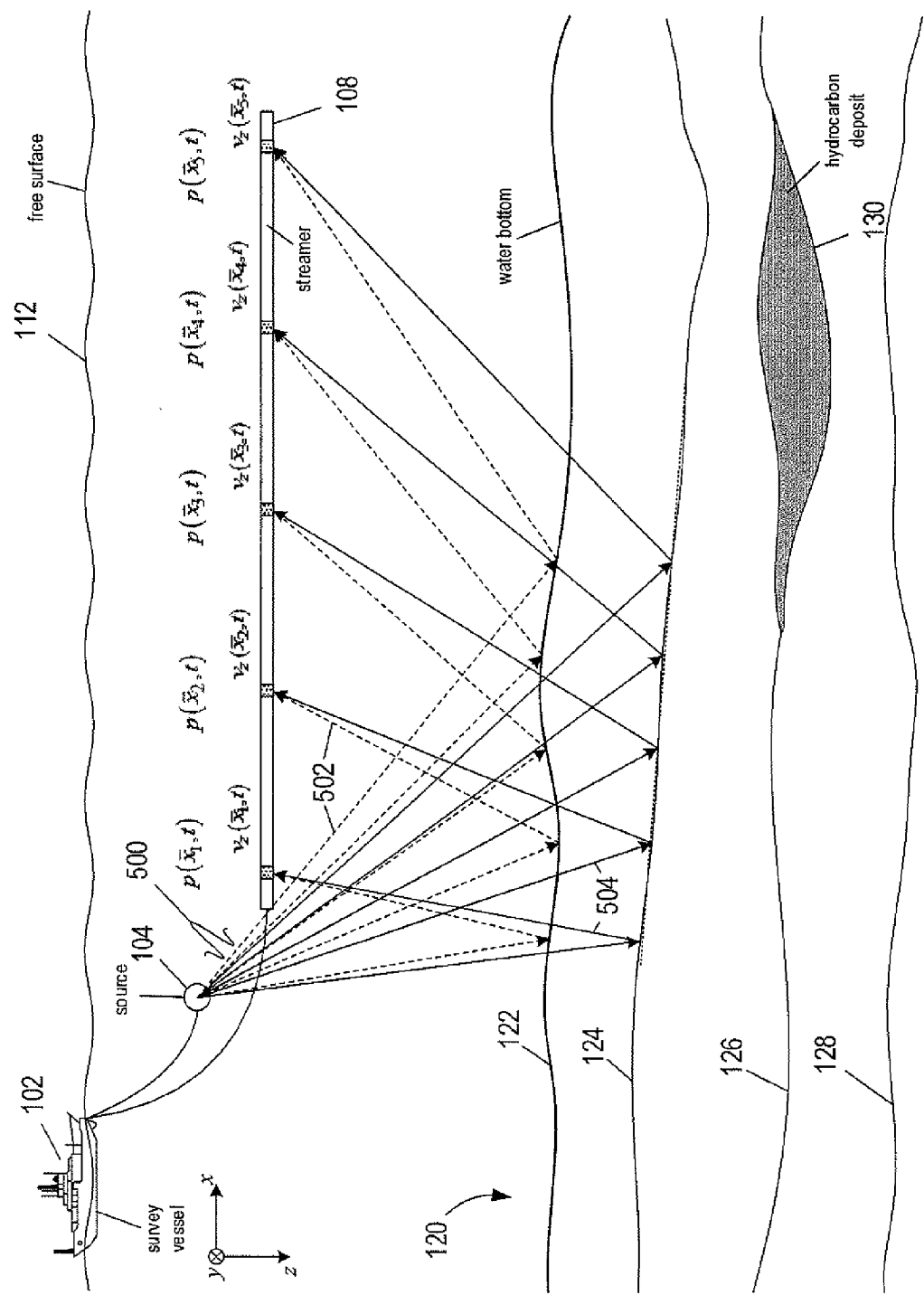
FIG. 5 shows example ray paths that represent paths an acoustic signal travels from a source into a subterranean formation.

FIG. 5 shows example ray paths that represent paths an acoustic signal 500 travels from the first source 104 to or into the subterranean formation 120. Dashed-line rays, such as rays 502, represent acoustic energy reflected from the formation surface 122 to the receivers located along the streamer 108, and solid-line rays, such as rays 504, represent acoustic energy reflected from the interface 124 to the receivers located along the streamer 108. Note that for simplicity of illustration only a handful of ray paths are represented. Each pressure sensor may measure the hydrostatic pressure and each particle motion sensor may measure the particle motion, velocity, or acceleration of the acoustic energy reflected from the subterranean formation 120 or interfaces therein. In the example of FIG. 5, the particle motion sensors located at each receiver measure vertical particle velocity of the wavefield emanating from the subterranean formation 120. The hydrostatic pressure data and/or particle motion data generated at each receiver may be time sampled and recorded as separate traces. In the example of FIG. 5, the collection of traces generated by the receivers along the streamer 108 for a single activation of the source 104 may be collected to form a "common-shot gather" or simply a "shot gather." The traces generated by the receivers located along each of the other five streamers for the same activation may be collected to form separate common-shot gathers, each gather associated with one of the streamers.

Figure 6:
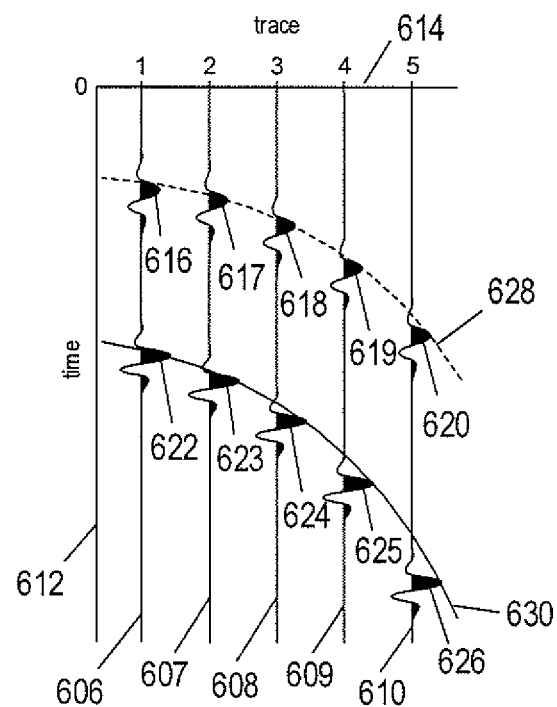
FIG. 6 shows a plot of a common-shot gather measured by five receivers located along a streamer shown in FIG. 5.

FIG. 6 shows a plot of a common-shot gather composed of example traces 606-610 of the wavefield measured by the five receivers located along the streamer 108 shown in FIG. 5. Vertical axis 612 represents time and horizontal axis 614 represents trace numbers with trace "1" representing the seismic data generated by the receiver closest to the source 104 and trace "5" representing the seismic data generated by the receiver located farthest along the length of the streamer from the source 104. The traces 606-610 may represent variation in the amplitude of either the pressure data or the particle velocity data recorded by corresponding sensors of the five receivers. The example traces include wavelets or pulses 616-620 and 622-626 that represent the up-going wavefield measured by the pressure sensors or particle motion sensors. Peaks, colored black, and troughs of each trace represent changes in the amplitude. The distances along the traces 606-610 from the trace number axis 614 (i.e., time zero) to the wavelets 616-620 represents two-way travel time of the acoustic energy output from the source 104 to the formation surface 122 and to the receivers located along the streamer 108, and wavelets 622-626 represents longer two-way travel time of the acoustic energy output from the source 104 to the interface 124 and to the same receivers located along the streamer 108. The amplitude of the peak or trough of the wavelets 616-620 and 622-626 indicate the magnitude of the reflected acoustic energy recorded by the receivers.

The arrival times versus source-receiver offset is longer with increasing source-receiver offset. As a result, the wavelets generated by a surface or an interface are collectively called a "reflected wave" that tracks a hyperbolic curve. For example, hyperbolic curve 628 represents the hyperbolic distribution of the wavelets 616-620 reflected from the formation surface 122.

Figure 7:
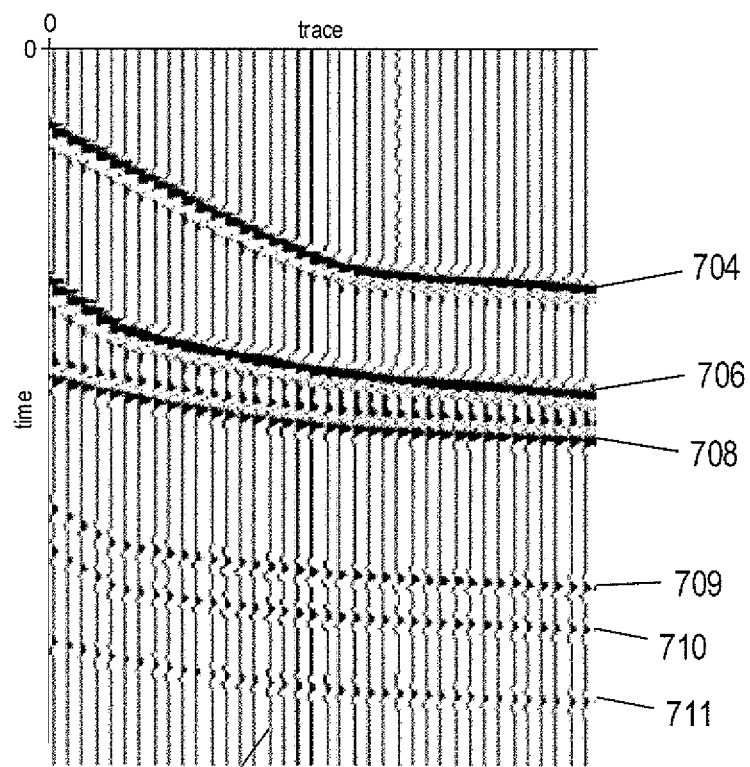
FIG. 7 shows a gather composed of 38 traces.

FIG. 7 shows a gather composed of 38 traces. Each trace, such as trace 702, varies in amplitude over time and represents acoustic energy reflected from a subterranean formation surface and five different interfaces within the subterranean formation as measured by a pressure sensor or a particle motion sensor. In the expanded view, wavelets that correspond to reflections from the formation surface or an interface within the subterranean formation appear chained together to form reflected waves. For example, wavelets 704 with the shortest transit time represent a reflected wave, and wavelets 706 represent a reflected wave emanating from an interface just below the formation surface. Reflected waves 708-711 represent reflections from interfaces located deeper within the subterranean formation.

The gathers shown in FIGS. 6 and 7 are sorted into a common-shot domain. A domain is a collection of gathers that share a common geometrical attribute with respect to the seismic data recording locations. The seismic data may be sorted into any suitable domain for examining the features of a subterranean formation including a common-receiver domain, a common-receiver-station domain, or a common-midpoint domain.

Figure 8:
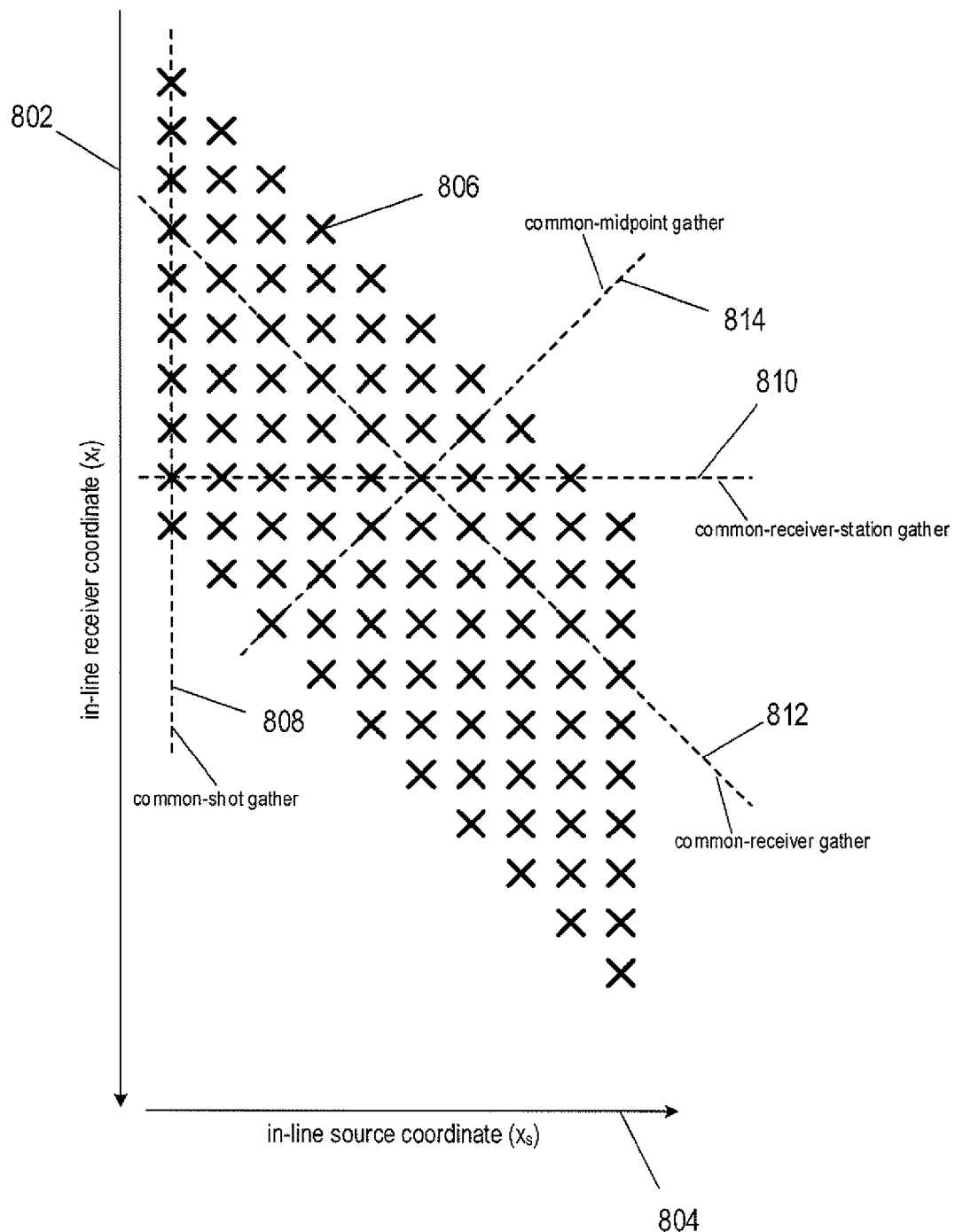
FIG. 8 shows a plot of different ways seismic data collected in a survey may be sorted into domains.

FIG. 8 shows a plot of different ways seismic data collected in a survey may be sorted into domains. Vertical axis 802 represents the in-line receiver coordinates and horizontal axis 804 represents the in-line source coordinates. X's, such as X 806, represent where a pressure or particle motion measurement has taken place. In this plot, a column of recordings identified by dashed line 808 represents a common-shot gather, and a row of recordings identified by dashed line 810 represents a common-receiver-station gather. Recordings collected along a diagonal represented by dashed line 812 is a common-receiver gather, and recordings collected along a diagonal represented by dashed line 814 is a common-midpoint gather. The gathers form different domains. For example, the shot gathers form a shot domain, the common-receiver gathers form a common-receiver domain, the common-receiver-station gathers form a common-receiver-station domain, and the common-midpoint gathers form a common-midpoint domain.

As explained above, a wavefield measured by pressure and particle motions sensors includes an up-going wavefield component and a down-going wavefield component. The up-going wavefield component may be further processed in order to generate seismic images of a subterranean formation. The seismic images may be used to extract information about the subterranean formation, such as locating and identifying hydrocarbon reservoirs or monitoring production of an existing hydrocarbon reservoir. However, the down-going wavefield component creates interference that is manifest as notches in the frequency spectrum and ghost effects in the seismic images. The pressure and particle motion wavefields measured by the multi-component sensors allow wavefield separation into up-going and down-going components so that the up-going components may be isolated used to generate seismic images.

Figure 9A:
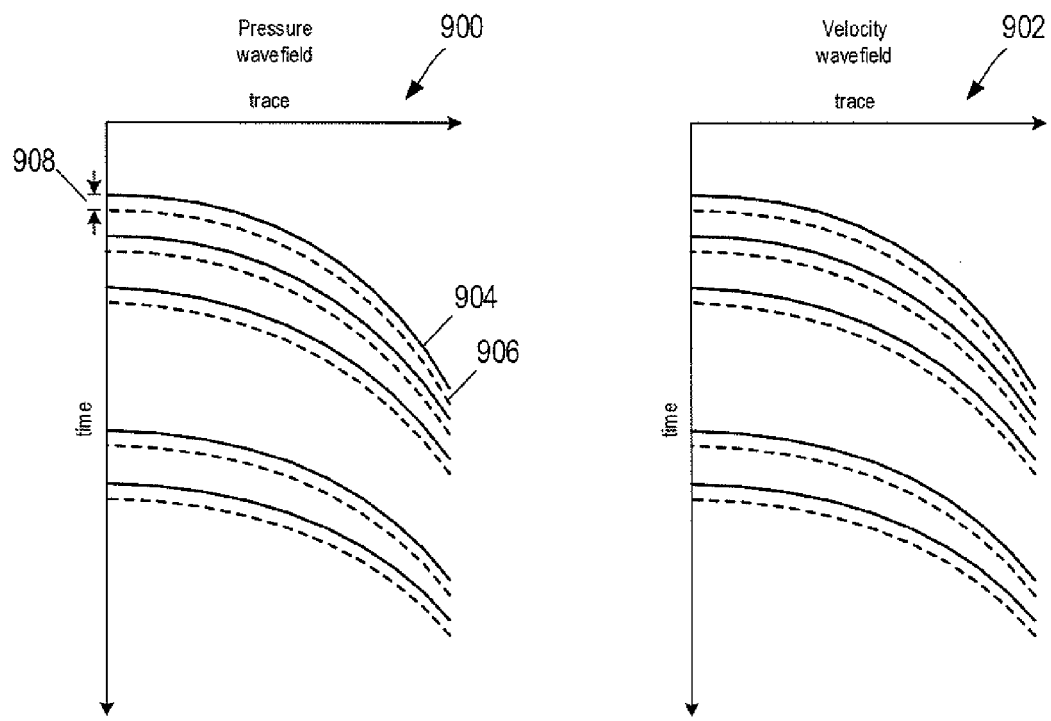
FIGS. 9A-9C show an overview of how a pressure wavefield may be separated into up-going and down-going wavefields.
Figure 9B:
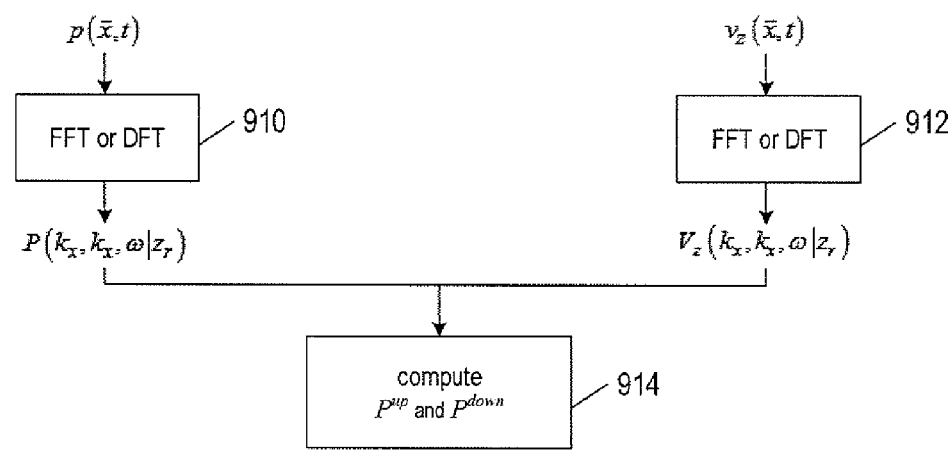
Figure 9C:
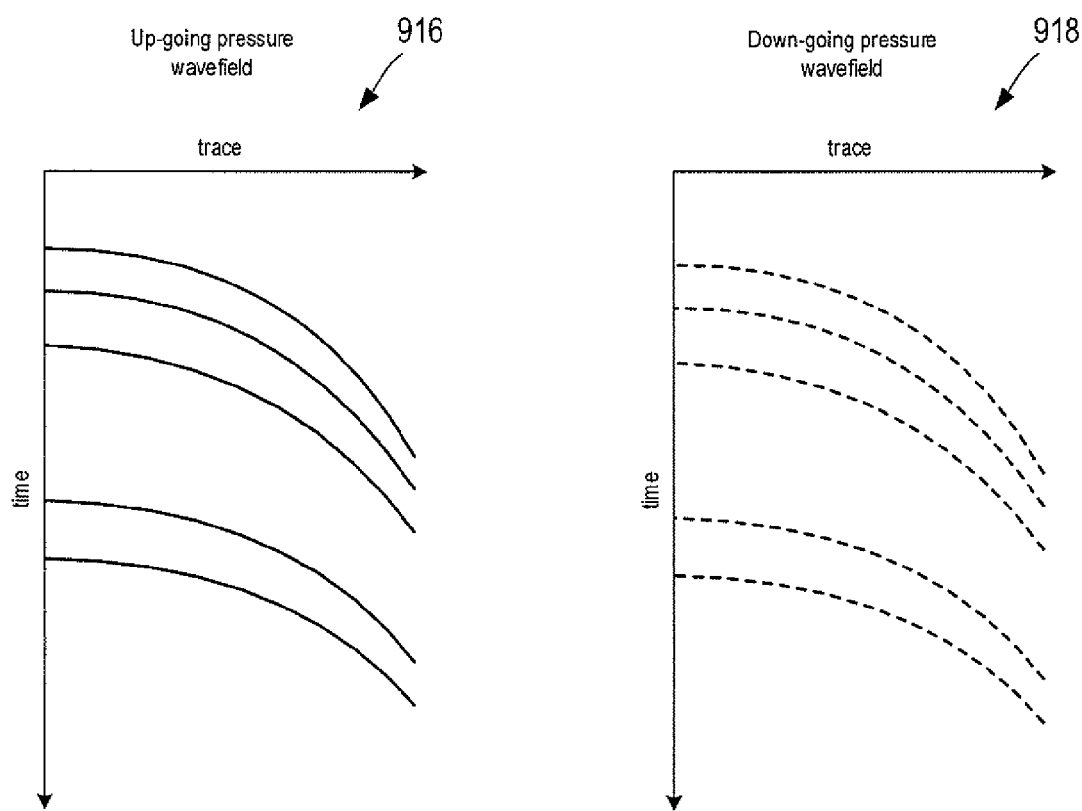

FIGS. 9A-9C provide an overview of how a pressure or vertical velocity wavefield may be separated into up-going and down-going wavefields. In FIG. 9A, a first synthetic common-shot gather 900 represents a pressure wavefield measured by a number of pressure sensors located along a streamer, and a second common-shot gather 902 represents a vertical velocity wavefield measured by particle motion sensors co-located with the pressure sensors. For the sake of simplicity, the gathers 900 and 902 show only up-going and down-going pressure wavefield components with solid curves representing the up-going pressure wavefield reflections and dashed curves represent the down-going pressure wavefield reflections. For example, solid curve 904 represents pressure variations created by a water-bottom reflection and dashed curve 906 represents pressure variations created by the same water-bottom reflection with a time delay 908 resulting from the time it takes for acoustic energy to travel up past the streamer to the free surface and back down to the streamer, as described above with reference to FIG. 2.

The multi-component acquisition of both pressure and vertical velocity wavefields at each receiver allow for removal of receiver ghost effects, leaving the up-going pressure or vertical velocity wavefield to compute seismic images of a subterranean formation free of receiver ghost effects. FIG. 9B shows a method for separating a pressure wavefield into up-going and down-going pressure wavefields. In FIG. 9B, the pressure wavefield 900 is transformed 910 from the space-time ("s-t") domain using a fast Fourier transform ("FFT"), or a discrete Fourier transform ("DFT"), to obtain a pressure wavefield in the frequency-wavenumber ("f-k") domain. In particular, each trace in the pressure wavefield represented by the gather 900 may be transformed as follows:

$$p(\vec{x}_r, t) \xrightarrow{FT} P(k_x, k_y, \omega | z_r) \quad (3)$$

where $k_x$ is the x-direction or in-line wavenumber;

$k_y$ is the y-direction or cross-line wavenumber; and $\omega$ is the angular frequency.

Likewise, the vertical velocity wavefield 902 may be transformed from the s-t domain using an FFT or a DFT to obtain a vertical velocity wavefield in the f-k domain. Each trace in the vertical velocity wavefield represented by the gather 902 is transformed 912 as follows:

$$v_z(\vec{x}_r, t) \xrightarrow{FT} V_z(k_x, k_y, \omega | z_r) \quad (4)$$

In the f-k domain, the pressure may be represented as a sum of up-going pressure and down-going pressures as follows:

$$P(k_x, k_y, \omega | z_r) = P^{up}(k_x, k_y, \omega | z_r) + P^{down}(k_x, k_y, \omega | z_r) \quad (5)$$

where $P^{up}(k_x, k_y, \omega | z_r)$ represents the up-going pressure in the f-k domain; and $P^{down}(k_x, k_y, \omega | z_r)$ represents the down-going pressure in the f-k domain.

The pressure and vertical velocity may be used to compute 914 the up-going and down-going pressures in the f-k domain according to $$P^{up}(k_x, k_y, \omega | z_r) = \frac{1}{2}\left[P(k_x, k_y, \omega | z_r) - \frac{\rho\omega}{k_z}V_z(k_x, k_y, \omega | z_r)\right] \quad (6a)$$

$$P^{down}(k_x, k_y, \omega | z_r) = \frac{1}{2}\left[P(k_x, k_y, \omega | z_r) + \frac{\rho\omega}{k_z}V_z(k_x, k_y, \omega | z_r)\right] \quad (6b)$$

where $\rho$ is the density of water; and $$k_z = \sqrt{\left(\frac{\omega}{c}\right)^2 - k_x^2 - k_y^2}$$

is the z-direction or vertical wavenumber with c the speed of sound in water.

The separate up-going and down-going pressures may be transformed from the f-k domain back to the s-t domain using an inverse FFT ("IFFT"), or inverse ("IDFT"), to obtain corresponding separate up-going and down-going pressures in the s-t domain.

FIG. 9C shows the separate up-going and down-going pressure wavefields, originally shown as combined pressure wavefield gather 900 of FIG. 9A, as separate up-going pressure wavefield in the gather 916 and down-going pressure wavefield in the gather 918. The seismic data represented by the up-going pressure wavefield in the gather 916 may be subjected to further seismic data processing to remove noise and other effects and serve as input to imaging methods that generate seismic images of the subterranean formation. The seismic images are free of the ghost effects represented by the down-going pressure wavefield 918, resulting in significantly higher resolution and deeper signal penetration into the subterranean formation than seismic images computed with the unseparated seismic data represented in the pressure wavefield gather 900.

The vertical velocity may also be a sum of up-going and down-going vertical velocities in the f-k domain as follows:

$$V_z(k_x, k_y, \omega | z_r) = V_z^{up}(k_x, k_y, \omega | z_r) + V_z^{down}(k_x, k_y, \omega | z_r) \quad (7)$$

where $V_z^{up}(k_x, k_y, \omega | z_r)$ represents the up-going vertical velocity in the f-k domain; and $V_z^{down}(k_x, k_y, \omega | z_r)$ represents the down-going vertical velocity wavefield in the f-k domain.

The pressure and vertical velocity may be used to compute the up-going and down-going vertical velocities in the f-k domain according to $$V_z^{up}(k_x, k_y, \omega | z_r) = \frac{1}{2}\left[V_z(k_x, k_y, \omega | z_r) - \frac{k_z}{\rho\omega}P(k_x, k_y, \omega | z_r)\right] \quad (8a)$$

$$V_z^{down}(k_x, k_y, \omega | z_r) = \frac{1}{2}\left[V_z(k_x, k_y, \omega | z_r) + \frac{k_z}{\rho\omega}P(k_x, k_y, \omega | z_r)\right] \quad (8b)$$

The up-going vertical velocity wavefield may be subjected to further seismic data processing to remove noise and other effects and, like the up-going pressure wavefield, serve as input to imaging methods that generate seismic images of the subterranean formation.

Equations (6) and (8) represent up-going and down-going pressures and vertical velocities of wavefields with corrections for pressure sensor and particle motion sensor responses. In other words, the pressure and vertical velocities calculated according to Equations (6) and (8) represents the pressure and the vertical velocity with the pressure sensor and particle motion sensor responses included. However, a pressure sensor and particle motion sensor each have system response associated with measuring a wavefield and generating an output. In the f-k domain, the measured pressured generated by a pressure sensor may be represented by:

$$P'(k_x,k_y,\omega|z_r) = S_p(\omega)P(k_x,k_y,\omega|z_r) \quad (9)$$

and the measured vertical velocity generated by particle motion sensor may be represented by $$V_z'(k_x,k_y,\omega|z_r) = S_v(\omega)V_z(k_x,k_y,\omega|z_r) \quad (10)$$

where $S_p(\omega) = s_p(\omega)e^{-i\varphi_p(\omega)}$ represents the pressure sensor response with amplitude $s_p(\omega)$ and phase $\varphi_p(\omega)$; and $S_v(\omega) = s_v(\omega)e^{-i\varphi_v(\omega)}$ represents the particle motion sensor response with amplitude $s_v(\omega)$ and phase $\varphi_v(\omega)$ in the z-direction In Equations (9) and (10), the pressure sensor response $S_p(\omega)$ and particle motion sensor response $S_v(\omega)$ do not depend on the horizontal wavenumbers $k_x$ and $k_y$ because the sensors are considered point sensors and not sensor arrays. For a known layout of sensors in a sensor array the sensor responses depend on corresponding horizontal wavenumbers.

In practice the pressure sensor response $S_p(\omega)$ and particle motion sensor response $S_v(\omega)$ may both be broadband or one of the two sensor responses is broadband while the other may be narrowband. For example, the pressure sensor response may be more broadband than the particle motion sensor responses, or vice versa. The characteristics of a sensor response depends on the type of sensor. For example, a microelectromechanical system accelerometer is more broadband than a piezoelectric pressure sensor response.

For the sake of clarity and brevity, in the following discussion the f-k domain coordinates $(k_x, k_y, \omega|z_r)$ are suppressed. A matching operator that characterizes a relationship between co-located pressure and particle motion sensor responses may be obtained as follows. The matching operator can be used to compute one or both of the co-located sensor responses. In the f-k domain, the total pressure measured by a pressure sensor may be expressed as a function of the up-going pressure and a ghost function:

$$P = P^{up}G_p(k_z, z_r) \quad (11)$$

where $G_p(k_z, z_r) = (1 + Re^{-ik_z 2z_r})$;

R is free surface reflectivity (e.g., R=−1 for a flat free surface approximation); and $z_r$ is depth of receiver r below the free surface.

The quantity $G_p(k_z, z_r)$ represents a pressure receiver ghost at receiver r created by upward propagation of a pressure wavefield that travels past a receiver at depth $z_r$ and is reflected back downward from the free surface to the receiver with a free surface reflectivity R. Receiver depths may be determined from depth sensors located at each receiver position. However, in practice, each receiver may not contain a depth sensor. In this case, receiver depths may be approximated by interpolating the shape of each streamer below the free surface based on depth measurements from depth sensors located along the length of a streamer. For example, an approximate receiver depth may be computed from the depth sensor measurements using any one of linear interpolation, polynomial interpolation, and spline interpolation. Substituting Equation (11) for the pressure P in Equation (6a) gives the vertical velocity:

$$V_z = -\frac{k_z}{\rho\omega}P^{up}G_v(k_z, z_r) \quad (12)$$

where $G_v(k_z, z_r) = (1 - Re^{-ik_z 2z_r})$.

The quantity $G_v(k_z, z_r)$ represents a vertical velocity receiver ghost. Substituting for the measured pressure and vertical velocity of Equations (9) and (10) for the pressure and vertical velocity in Equations (11) and (12) gives $$P' = S_p P^{up} G_p(k_z, z_r) \quad (13)$$

$$V_z' = -S_v \frac{k_z}{\rho\omega} P^{up} G_v(k_z, z_r) \quad (14)$$

Multiplying Equation (13) by $G_v(k_z, z_r)$ and Equation (14) by $G_p(k_z, z_r)$ gives $$P' G_v(k_z, z_r) = S_p P^{up} G_p(k_z, z_r) G_v(k_z, z_r) \quad (15)$$

$$V_z' G_p(k_z, z_r) = -S_v \frac{k_z}{\rho\omega} P^{up} G_v(k_z, z_r) G_p(k_z, z_r) \quad (16)$$

Dividing Equation (16) by Equation (15) gives an estimated matching operator that relates co-located pressure and particle motion sensor responses as follows:

$$\frac{\tilde{S}_p(k_x, k_y, \omega)}{\tilde{S}_v(k_x, k_y, \omega)} = -\frac{k_z}{\rho\omega}\frac{P'(k_x, k_y, \omega|z_r)}{V_z'(k_x, k_y, \omega|z_r)}\frac{G_v(k_z, z_r)}{G_p(k_z, z_r)} \quad (17)$$

Equation (17) is an estimated matching operator between the pressure sensor response and the particle motion sensor response and is a function of frequency and the horizontal wavenumbers (see Equation 6 where $k_z$ is a function of the horizontal wavenumbers). The estimated matching operator is computed from the measured pressure P' and the measured vertical velocity V'$_z$ at co-located pressure and particle motion sensors located at depth $z_r$ and by cross-ghosting the pressure ghost G$_p$(k$_z$, z$_r$) and vertical velocity receiver ghost G$_v$(k$_z$, z$_r$) given in Equations (11) and (12). For each frequency ω, a value of the estimated matching operator is computed over the full ranges of horizontal wavenumbers k$_x$ and k$_y$ samples. The horizontal wavenumbers for a given frequency should be constant for point sensors. However, the noise and singularities of the horizontal wavenumbers create instabilities. As result, there may be many estimated matching operator values for any given frequency.

The matching operator has a number of singularities because the ghost function in the denominator has notches with zero amplitude at particular points in the frequency spectrum depending on the receiver depth $z_r$. For example, when the reflectivity R is −1, the ghost function has notches at receiver depths $$z_r = \frac{\pi}{2k_z}(2n-1) \tag{18}$$

where n=1, 2, 3, . . . .

In all other parts of the frequency spectrum, the matching operator between co-located pressure and particle motion sensors is defined. Because the matching operator varies little after each source activation and does not depend on the local geometry, a large number of source activations may be used to determine the matching operator as given by Equation (17).

The notches described above with reference to FIG. 4 depend on the distance a wavefield travels from the streamer to the free surface and back to the streamer. In particular, the notches depend on receiver depth and travel direction, i.e. angle, which is represented by the horizontal wavenumbers k$_x$ and k$_y$. As a result, the notches occur at different frequencies for different horizontal wavenumbers k$_x$ and k$_y$. If for a given frequency and horizontal wavenumbers k$_x$ and k$_y$ in the estimated matching operator given by Equation (17) cannot be computed due to a notch (i.e., division by zero), the matching operator may be computed for any frequency by averaging over the horizontal wavenumbers. Because the estimated matching operating for each pair of co-located pressure and particle motion sensors is substantially constant over the ranges of horizontal wavenumbers, for each frequency ω the estimated matching operator may be computed by averaging the estimated matching operator of Equation 17 over the horizontal wavenumbers k$_x$ and k$_y$ in order to obtain an average estimated matching operator as a function of frequency only:

$$\left\langle \frac{S_p}{S_v} \right\rangle = \frac{\sum_{k_x,k_y} W(\omega, k_x, k_y) \frac{\tilde{S}_p(\omega, k_x, k_y)}{\tilde{S}_v(\omega, k_x, k_y)}}{\sum_{k_x,k_y} W(\omega, k_x, k_y)} \tag{19}$$

where
the symbol ⟨·⟩ represents average over horizontal wavenumbers k$_x$ and k$_y$; and
W(ω, k$_x$, k$_z$) is a weight function.
In one implementation, the weight function may be given by a product of absolute values of the pressure and particle velocity ghosts, W(ω, k$_x$, k$_z$)=|G$_p$(k$_z$, z$_r$)||G$_v$(k$_z$, z$_r$)|.

Substituting Equations (9) and (10) into Equations (6a) and (6b) and multiplying by the pressure sensor response S$_p$ gives the measured up-going pressure:

$$P^{up'} = \frac{1}{2}\left[P' - \frac{\rho\omega}{k_z}\frac{S_p}{S_v}V'_z\right] \tag{20a}$$

and the measured down-going pressure:

$$P^{down'} = \frac{1}{2}\left[P' - \frac{\rho\omega}{k_z}\frac{S_p}{S_v}V'_z\right] \tag{20b}$$

Equations (20a) and (20b) represent combining the measured pressure P' and the matching operator, S$_p$/S$_v$, applied to the measured vertical velocity V'$_z$ to compute separate up-going and down-going pressures P$^{up\prime}$ and P$^{down\prime}$ convolved with the pressure sensor response S$_p$.

Likewise, substituting Equations (9) and (10) into Equations (8a) and (8b) and multiplying by the particle motion sensor response gives the measured up-going vertical velocity:

$$V_z^{up'} = \frac{1}{2}\left[V'_z - \frac{k_z}{\rho\omega}\frac{S_v}{S_p}P'\right] \tag{21a}$$

and the measured down-going pressure:

$$V_z^{down'} = \frac{1}{2}\left[V'_z - \frac{k_z}{\rho\omega}\frac{S_v}{S_p}P'\right] \tag{21b}$$

Equations (21a) and (21b) represent combining the measured vertical velocity V'$_z$ and the inverse of matching operator, S$_v$/S$_p$, applied to the measured pressure P' to compute separate up-going and down-going vertical velocities V$_z^{up\prime}$ and V$_z^{down\prime}$ convolved with the particle motion sensor response S$_v$.

Equations (20) and (21) may be used to compute the up-going and down-going wavefields when both the pressure and the particle motion sensor responses are known. However, when both the pressure and particle motion sensor responses are unknown, the estimated matching operator $\tilde{S}_v/\tilde{S}_p$ given by Equation (17) or the average estimated matching operator ⟨S$_v$/S$_p$⟩ given by Equation (19) may be used to compute the matching operator S$_v$/S$_p$ in Equations (20) and (21).

Alternatively, in cases where the pressure sensor response is broadband and the particle motion sensor response is narrowband or unknown, the known pressure sensor response S$_p$ may be used to compute an estimated particle motion sensor response for a co-located particle motion sensor over the same broadband as follows:

$$\tilde{S}_v(k_x, k_y, \omega) = -S_p\frac{\rho\omega}{k_z}\frac{V'_z(k_x, k_y, \omega | z_r)}{P'(k_x, k_y, \omega | z_r)}\frac{G_p(k_z, z_r)}{G_v(k_z, z_r)} \tag{22}$$

And in cases where the particle motion sensor response is broadband and the pressure sensor response is narrowband or unknown, the matching operator and a known particle motion sensor response S$_v$ may be used to compute an estimated pressure sensor response for a co-located pressure sensor over the same broadband as follows:

$$\tilde{S}_p(k_x, k_y, \omega) = -S_v \frac{k_z}{\rho\omega} \frac{P'(k_x, k_y, \omega | z_r)}{V'_z(k_x, k_y, \omega | z_r)} \frac{G_v(k_z, z_r)}{G_p(k_z, z_r)} \quad (23)$$

Because the matching operators described above in Equations (17) and (19) may be substantially constant (i.e., stable) for the duration of a marine seismic survey, calculation of an estimated matching operator according to Equation (17) and an averaged estimated matching operator according to Equation (19) and wavefield separation may be accomplished in real time while seismic data is being collected. For example, the average estimated matching operator given by Equation (19) may be calculated as a running average. When the marine survey is finished, an average estimated matching operator may be obtained. Wavefield separation described above with reference to Equations (20) and (21) may be carried out in real time while seismic data is being collected using an estimated or average estimated matching operator derived by a running average, or at completion of the marine survey using an estimated or average estimated matching operator representative of the survey.

Figure 10:
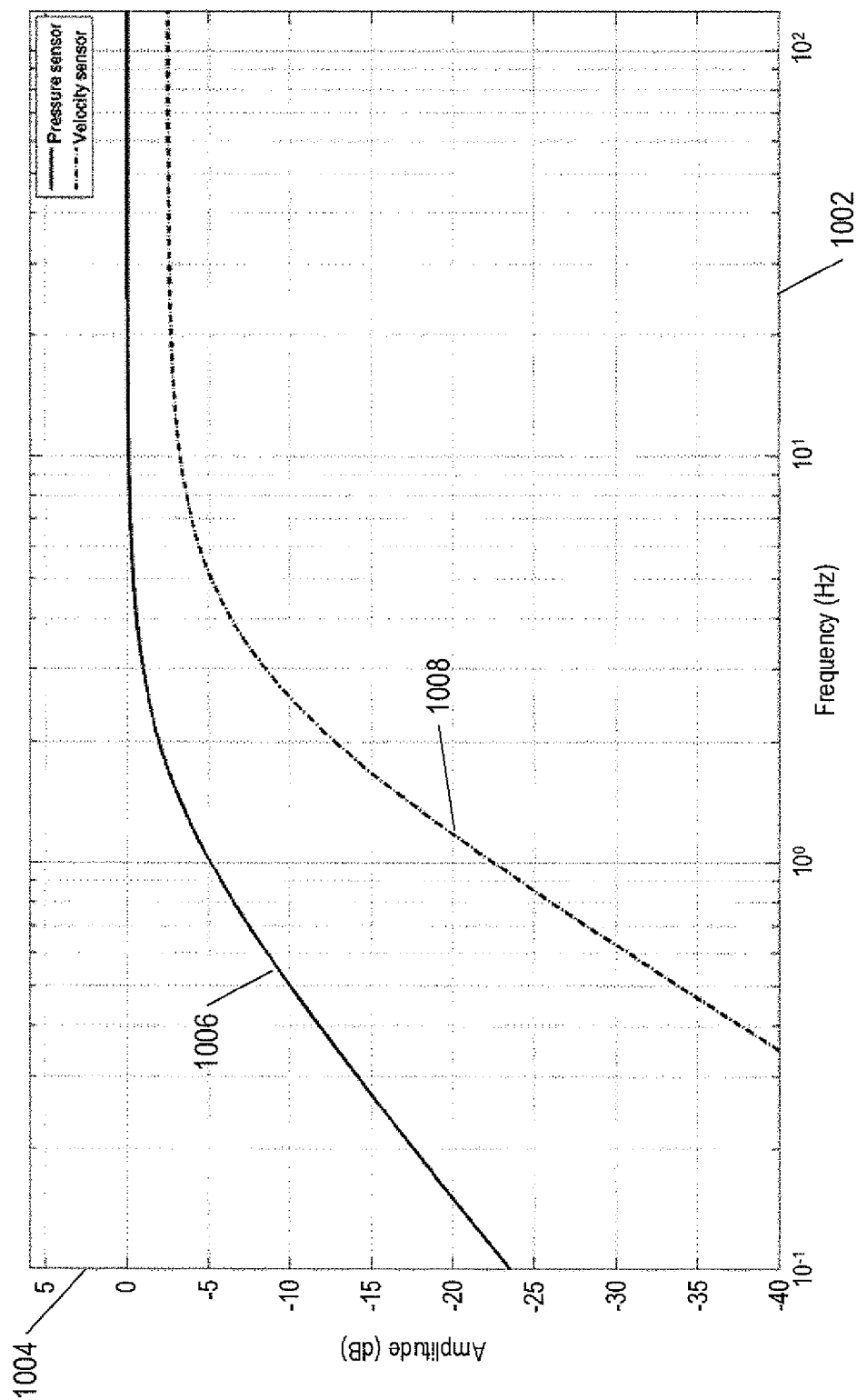
FIG. 10 shows a plot of synthetic pressure and particle motion sensor response amplitudes in the frequency-wavenumber domain.

FIG. 10 shows a plot of synthetic pressure and particle motion sensor response amplitudes in the frequency domain. Horizontal axis 1002 represents a portion of the frequency domain and vertical axis 1004 represents the amplitude of the pressure and particle motion sensor responses in dB. Curve 1006 represents the amplitude component $s_p(\omega)$ of the pressure sensor response $S_p(\omega)$ introduced in Equation (9) and dashed curve 1008 represents the amplitude component $s_v(\omega)$ of the particle motion sensor response $S_v(\omega)$ introduced in Equation (10). Curves 1006 and 1008 represent amplitudes of typical responses of pressure and particle motion sensors. In this example, the amplitudes of pressure sensor response 1006 and the particle motion sensor response 1008 diverge over lower frequencies and are asymptotic over higher frequencies.

Figure 11:
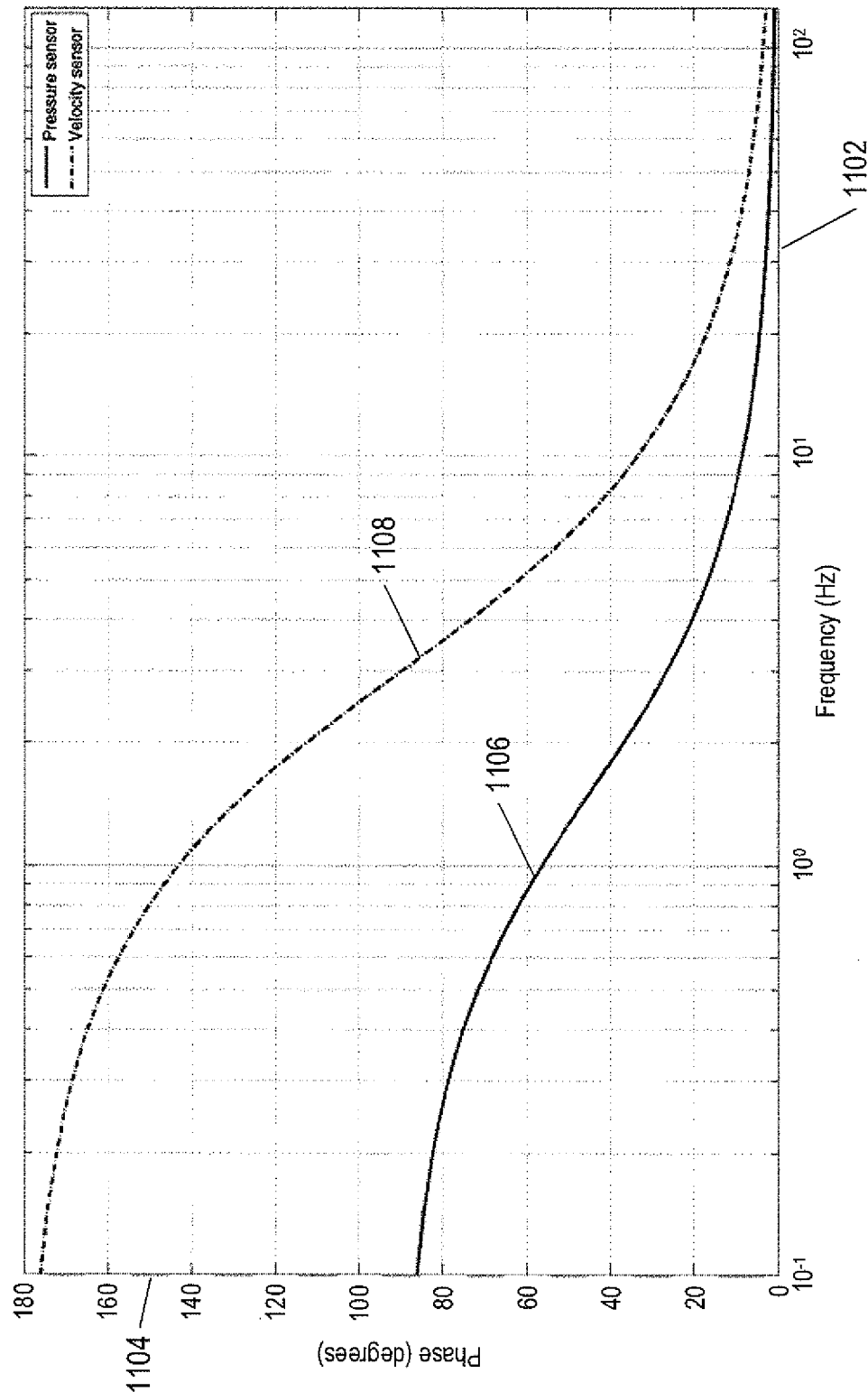
FIG. 11 shows a plot of synthetic phase responses for the same pressure and particle motion sensors that produced the pressure and particle motion sensor response amplitudes shown in FIG. 10.

FIG. 11 shows a plot of synthetic phase responses for the same pressure and particle motion sensors that produced the pressure and particle motion sensor response amplitudes shown in FIG. 10. Horizontal axis 1102 represents a portion of the frequency domain and vertical axis 1104 represents the phase in degrees. Curve 1106 represents how the phase $\varphi_p$ produced by the pressure sensor changes over the frequency spectrum and curve 1108 represents how the phase $\varphi_v$ produced by the particle motion sensor changes over the frequency spectrum. In this example, the curves 1106 and 1108 both show the largest phase changes imparted by the pressure sensor and particle motion sensor occur for low frequencies with the particle motion sensor generating larger phase change than the pressure sensor for low frequencies.

Figure 12:
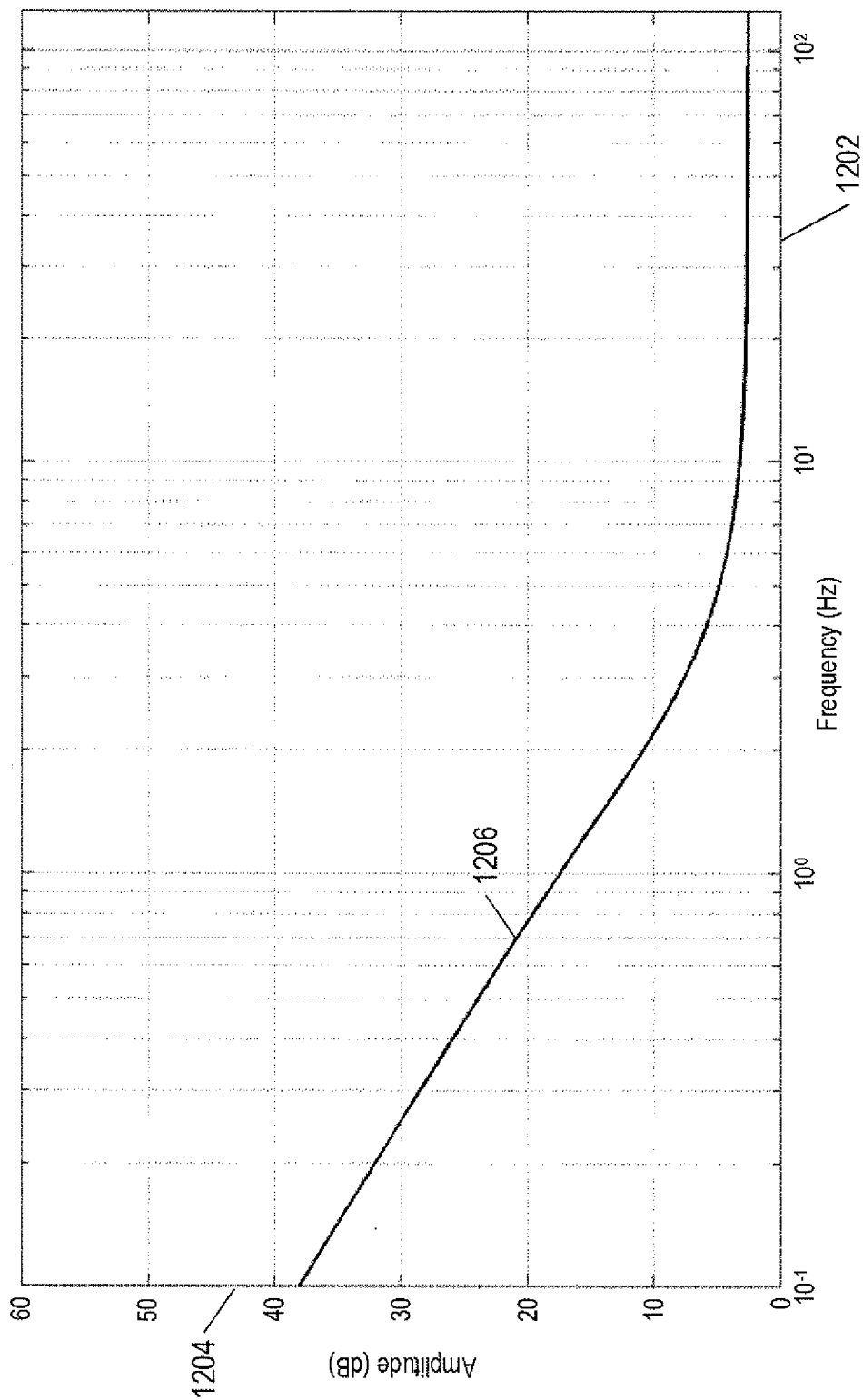
FIG. 12 shows a plot of a matching operator between the pressure sensor response and the particle motion sensor response shown in FIG. 10.

FIG. 12 shows a plot of $|S_p/S_v|$ of the matching operator between the pressure sensor response and the particle motion sensor response shown in FIG. 10. Horizontal axis 1202 represents a portion of the frequency domain and vertical axis 1204 represents the amplitude in dB. Curve 1206 represents the amplitude of the matching operator $|S_p/S_v|$ over the frequency domain with the amplitude of the matching operator decreasing to a constant value for frequencies greater than about 50 Hz. The amplitude of the matching operator decreased for frequencies less than about 50 Hz, while the amplitude of the matching operator is essentially constant for frequencies greater than about 50 Hz.

Figure 13:
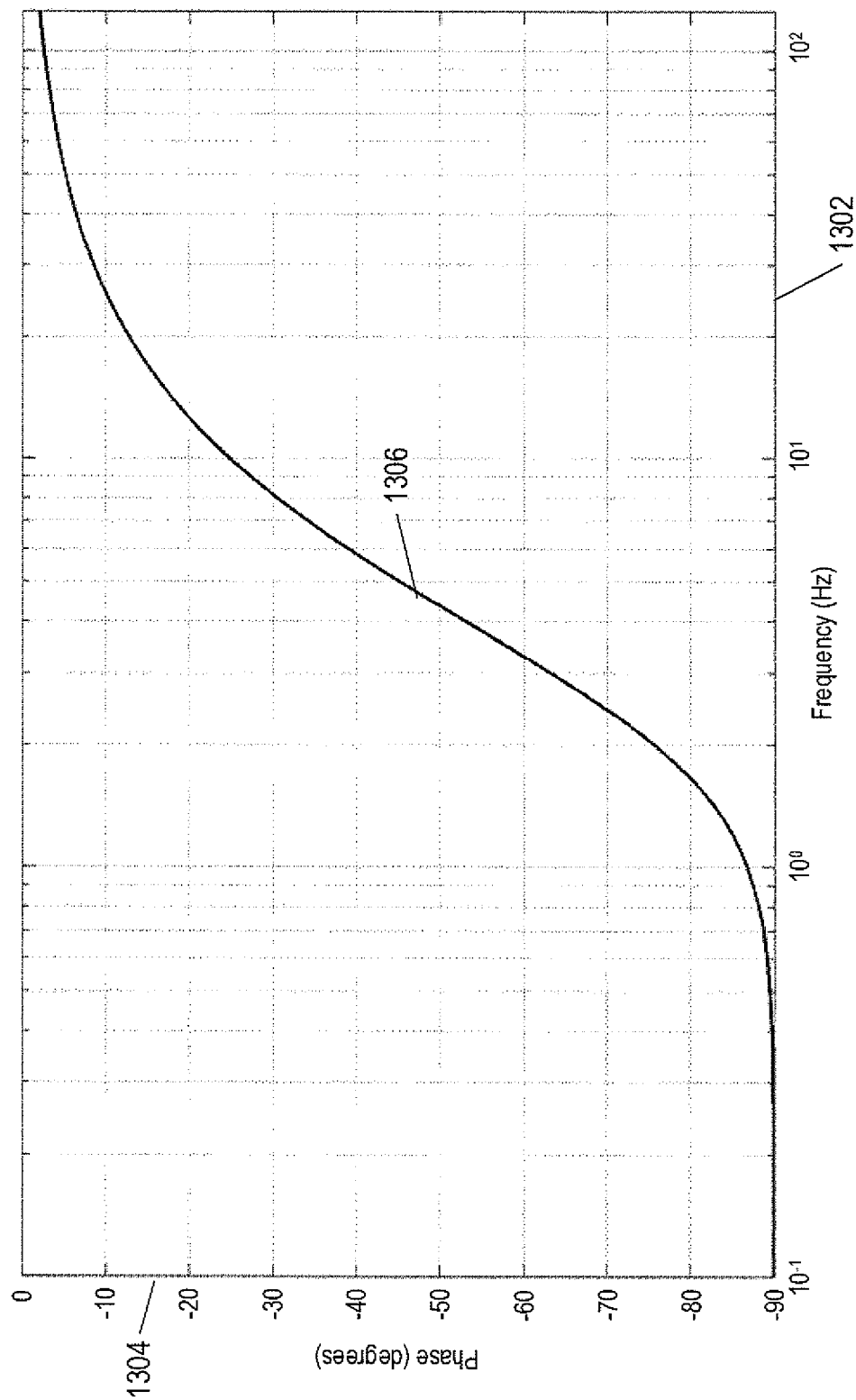
FIG. 13 shows a plot of phase component of the matching operator between the velocity and pressure sensor responses shown in FIG. 12.

FIG. 13 shows a plot of the phase component of the matching operator between the velocity and pressure sensor responses shown in FIG. 12. Horizontal axis 1302 represents a portion of the frequency domain and vertical axis 1204 represents the phase in degrees. Curve 1306 represents how the phase of the matching operator changes from about −90 degrees for low frequencies to about zero for higher frequencies over the frequency domain.

Figure 14A:
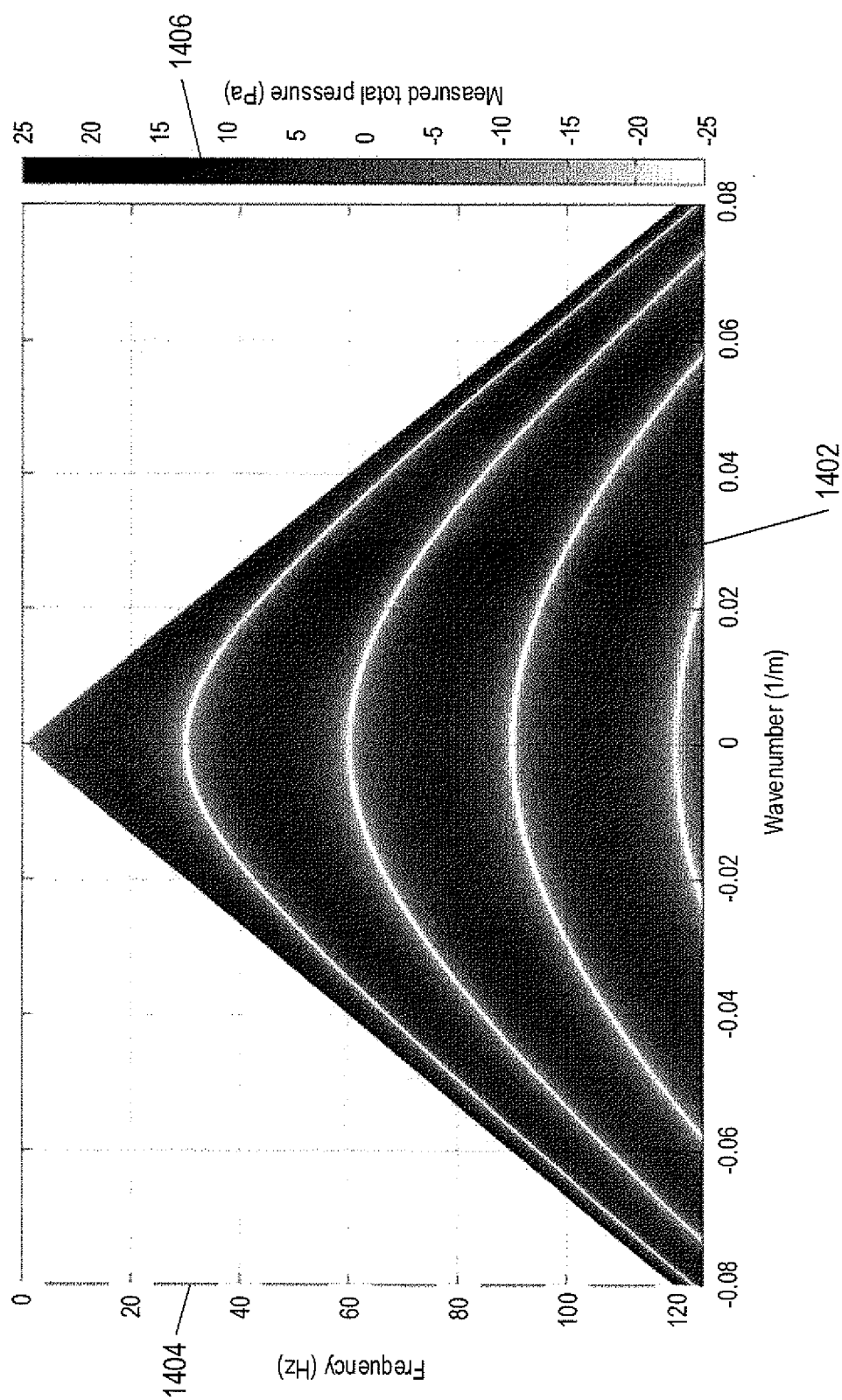
FIGS. 14A-14B show frequency-wavenumber spectrum plots of a synthetic total pressure wavefield and synthetic total vertical velocity wavefield, respectively.
Figure 14B:
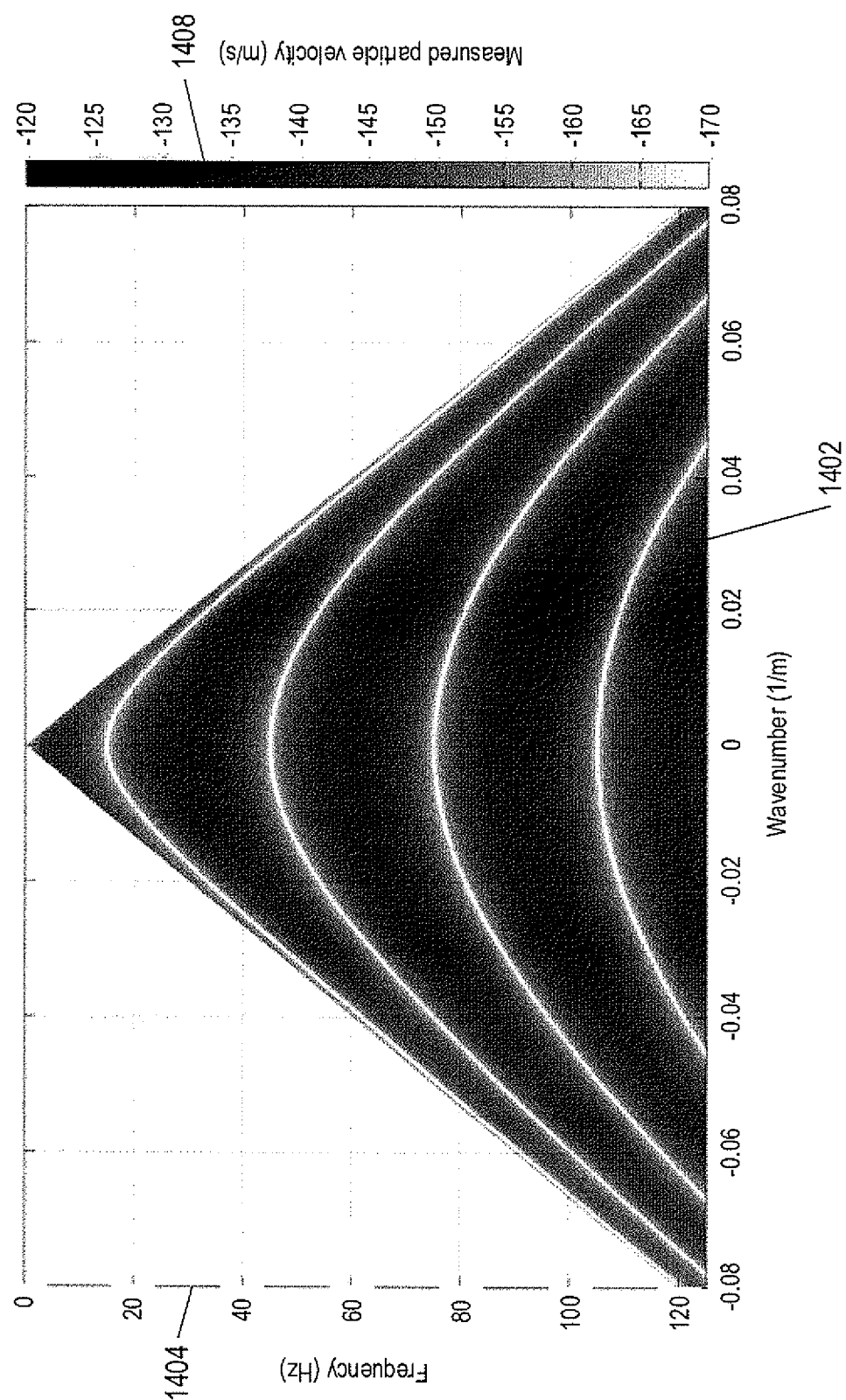

FIGS. 14A-14B shows frequency-wavenumber spectrum plots of a synthetic total pressure wavefield and synthetic total vertical velocity wavefield, respectively. Horizontal axes 1402 represent the wavenumber and vertical axes 1404 represent the frequency. Shading represented by bar 1406 in FIG. 14A represent the measured pressure wavefield and shading represented by bar 1408 in FIG. 14B represent the measured vertical velocity wavefield. The synthetic wavefields were calculated based on a uniform amplitude noise response of the earth and source across nearly all frequencies and wavenumbers. The receivers were set to the same depth of 25 m with the pressure sensor response shown in FIGS. 1 and 2. The receiver ghost was included and the data are noise free. The vertical velocity wavefield shown in FIG. 14B also includes all angles between ±90 degrees of the vertical particle velocity field.

Figure 15A:
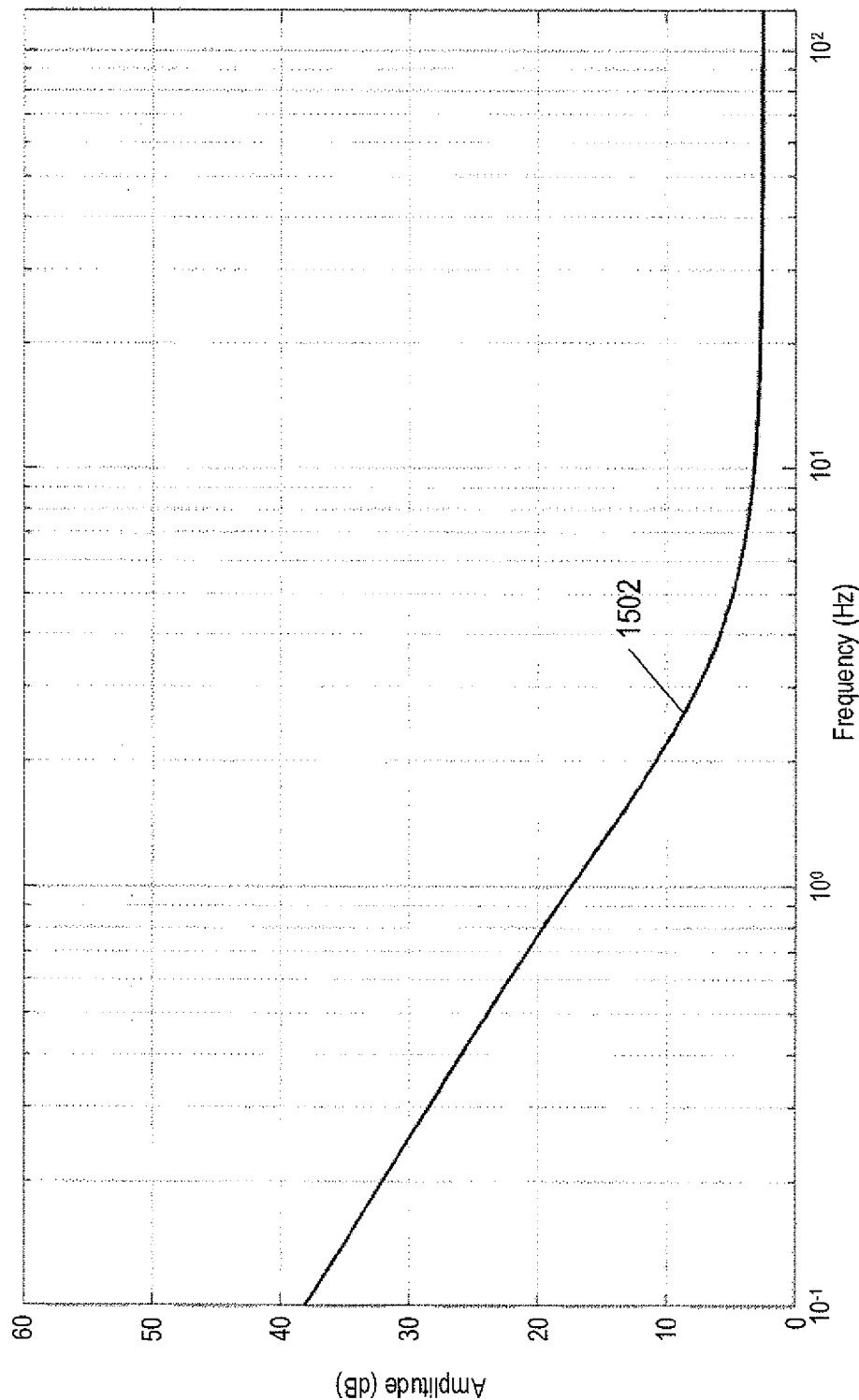
FIGS. 15A-15B show plots of amplitude and phase of a matching operator between particle motion sensor and pressure sensor responses from the synthetic wavefields shown in FIGS. 14A and 14B.
Figure 15B:
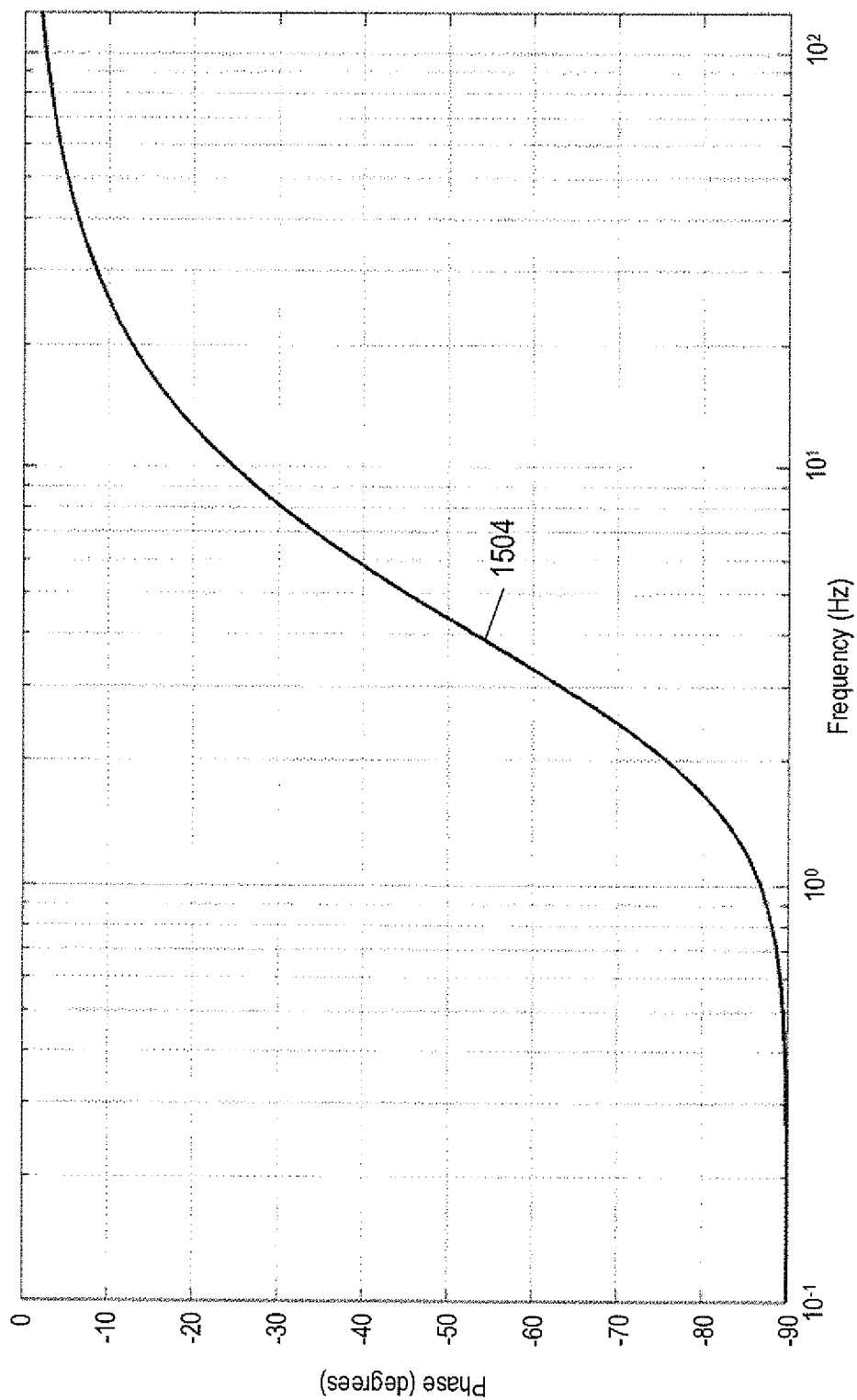

FIG. 15A show a plot of the amplitude $|S_p/S_v|$ of the matching operator between particle motion sensor and pressure sensor responses from the synthetic wavefields shown in FIGS. 14A and 14B computed based on Equation (17). The amplitude $|S_p/S_v|$ represented by curve 1502 is essentially the same as the amplitude represented by curve 1206 in FIG. 12. FIG. 15B shows a plot of phase of the matching operator between velocity and pressure sensor responses from the synthetic wavefields shown in FIGS. 14A and 14B computed based on Equation (17). The phase represented by curve 1504 is essentially the same as the phase curve 1306 shown in FIG. 13.

In alternative implementations, a matching operator may be computed based on wavefield data obtained from accelerometers and pressure sensors. A matching operator based on measured acceleration and pressure wavefields may be obtained from the matching operator given by Equation (17) as follows. In the f-k domain, the vertical particle velocity is related to the vertical particle acceleration as follows:

$$i\omega V_z = A_z \quad (24)$$

where $A_z$ represents the vertical particle acceleration in the f-k domain.

The vertical particle acceleration $A_z$ may be obtained by using particle accelerometers and transforming the vertical particle accelerations $a(\vec{x}, t)$ from the s-t domain to the f-k domain or by differentiating the vertical particle velocity. Substituting the vertical particle acceleration in Equation (24) for the vertical particle velocity in Equation (12) gives $$A_z = -\frac{ik_z}{\rho} P^{up} G_v(k_z, z_r) \quad (25)$$

The measured vertical particle acceleration is given by $$A_z' = S_a A_z \quad (26)$$

where $S_a = S_a(\omega) = s_a(\omega)e^{-i\varphi_s(\omega)}$ is the vertical accelerometer response with amplitude $s_a(\omega)$ and phase $\varphi_a(\omega)$.

Substituting the acceleration given by Equation (24) for the measured vertical particle velocity in the matching operator of Equation (17) gives $$\frac{\tilde{S}_p(k_x, k_y, \omega)}{\tilde{S}_a(k_x, k_y, \omega)} = -\frac{ik_z}{\rho} \frac{P'(k_x, k_y, \omega | z_r)}{A'_z(k_x, k_y, \omega | z_r)} \frac{G_v(k_z, z_r)}{G_p(k_z, z_r)} \quad (27)$$

As explained above with reference to Equation (19), the notches depend on receiver depth and travel direction, i.e. angle, which is represented by the horizontal wavenumbers $k_x$ and $k_y$. As a result, the notches occur at different frequencies for different horizontal wavenumbers $k_x$ and $k_y$. The estimated matching operator given by Equation 27 may be computed for frequencies associated with notches by averaging over the horizontal wavenumbers $k_x$ and $k_y$ to give a sensor response as a function of frequency only analogous to Equation 19:

$$\left\langle \frac{S_p}{S_a} \right\rangle = \frac{\sum_{k_x, k_y} W(\omega, k_x, k_y) \frac{\tilde{S}_p(\omega, k_x, k_y)}{\tilde{S}_a(\omega, k_x, k_y)}}{\sum_{k_x, k_y} W(\omega, k_x, k_y)} \quad (28)$$

In one implementation, the weight function may be given by a product of absolute values of the pressure and particle velocity ghosts, $W(\omega, k_x, k_z) = |G_p(k_z, z_r)||G_v(k_z, z_r)|$.

Substituting Equation (24) into Equation (20) gives a measured up-going pressure:

$$P^{up'} = \frac{1}{2}\left[P' - \frac{i\rho\omega^2}{k_z}\frac{S_p}{S_a}A'_z\right] \quad (29a)$$

and a measured down-going pressure:

$$P^{down'} = \frac{1}{2}\left[P' + \frac{i\rho\omega^2}{k_z}\frac{S_p}{S_a}A'_z\right] \quad (29b)$$

Equation (29) may be used to compute the up-going and down-going wavefields when both the pressure and the particle motion sensor responses are broadband. However, when both the pressure and particle motion sensor responses are unknown, the estimated matching operator $\tilde{S}_a/\tilde{S}_p$ given by Equation (27) or the average estimated matching operator $\langle S_a/S_p \rangle$ given by Equation (28) may be used to compute the matching operator $S_a/S_p$ in Equation (29). Analogous equations may also be obtained for the up-going and down-going vertical velocity wavefields.

Alternatively, in cases where the pressure sensor response is broadband and the accelerometer sensor response is narrowband or unknown, the known pressure sensor response $S_p$ may be used to compute an estimated accelerometer sensor response for a co-located accelerometer over the same broadband as follows:

$$\tilde{S}_a(k_x, k_y, \omega) = -S_p \frac{\rho}{ik_z} \frac{A'_z(k_x, k_y, \omega | z_r)}{P'(k_x, k_y, \omega | z_r)} \frac{G_p(k_z, z_r)}{G_v(k_z, z_r)} \quad (30)$$

And in cases where the accelerometer sensor response is broadband and the pressure sensor response is narrowband or unknown, the matching operator and a known accelerometer sensor response $S_a$ may be used to compute an estimated pressure sensor response for a co-located pressure sensor over the same broadband as follows.

$$\tilde{S}_p(k_x, k_y, \omega) = -S_a \frac{ik_z}{\rho} \frac{P'(k_x, k_y, \omega | z_r)}{A'_z(k_x, k_y, \omega | z_r)} \frac{G_v(k_z, z_r)}{G_p(k_z, z_r)} \quad (31)$$

Like estimated and average estimated matching operators described above with reference to Equations (17) and (19), the matching operators given by Equations (27) and (28) may be substantially constant for the duration of a marine seismic survey. Calculation of the matching operators represented by Equations (27) and (28) and wavefield separation may be accomplished in real time while seismic data is being collected. For example, the average estimated matching operator given by Equation (28) may be calculated as a running average. When the marine survey is finished, an average estimated matching operator is obtained.

Figure 16:
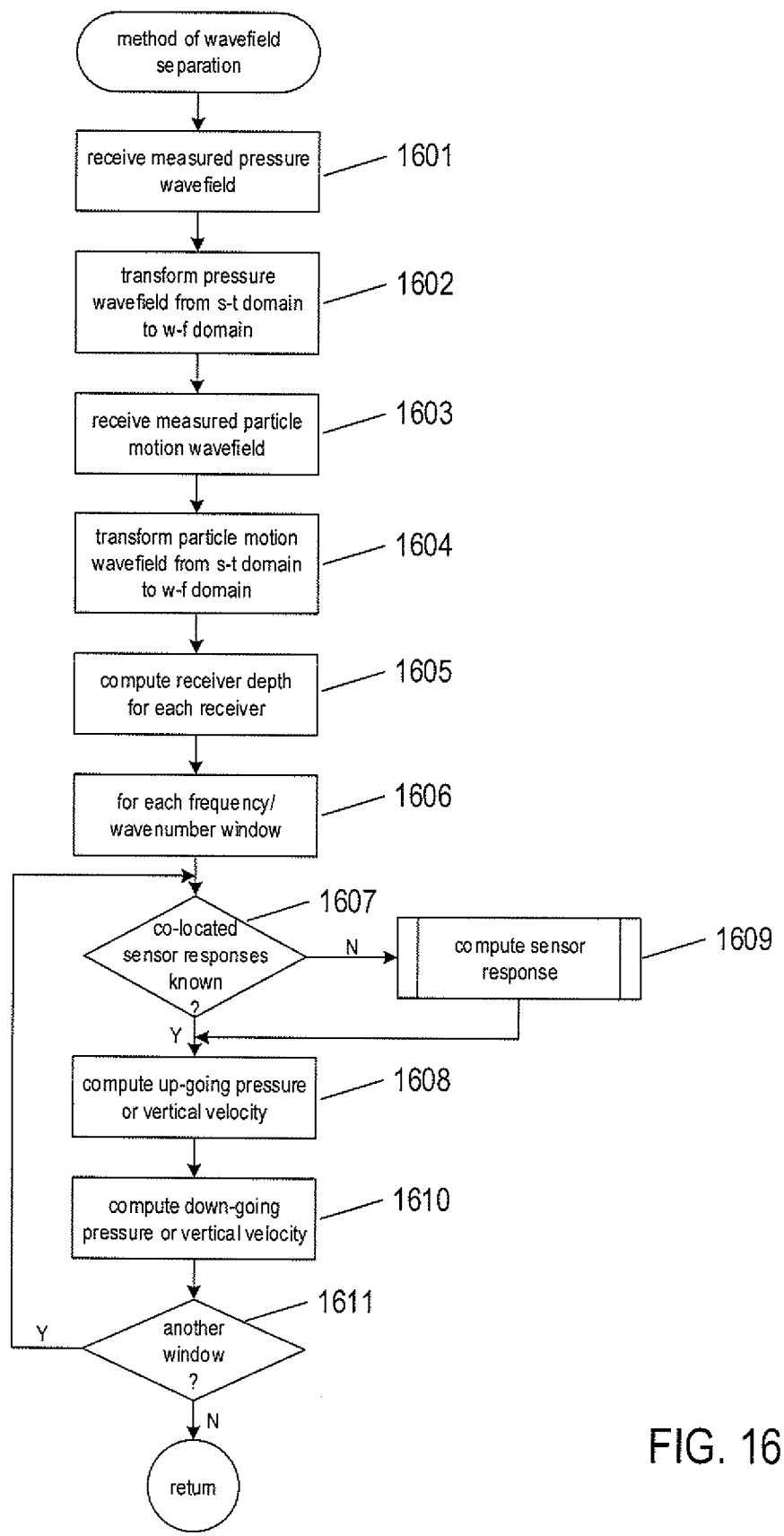
FIG. 16 shows a control-flow diagram of a wavefield-separation method.

FIG. 16 shows a control-flow diagram of a wavefield-separation method. In block 1601, a measured pressure wavefield is received. The measured pressure wavefield may be a gather of pressure sensor measurements that includes up-going and down-going pressure wavefield components, as described above with reference to FIG. 9A. In block 1602, the measured pressure wavefield is transformed from the s-t domain to the f-k domain using an FFT or a DFT as described above with reference to Equation (3). In block 1603, a measured particle motion wavefield is received. The measured particle motion wavefield may be a vertical velocity wavefield or vertical acceleration wavefield. The measured particle motion wavefield is composed of traces generated by particle motion sensors co-located with the pressure sensors used to generate the pressure wavefield in block 1601. The measured particle motion wavefield includes up-going and down-going wavefield components, as described above with reference to FIG. 9A. In block 1604, the measured particle motion wavefield is transformed from the s-t domain to the f-k domain using an FFT or a DFT as described above with reference to Equation (3). The steps performed in blocks 1603 and 1604 may be performed before or concurrently with the steps performed in blocks 1601 and 1602. In block 1605, the depth of the co-located pressure and particle motion sensors comprising each receiver are determined. The depths may be obtained from depth-measuring devices located at each receiver or by interpolating the depths based on depth measures obtained from depth measuring devices located at various locations along the streamers. A for-loop beginning in block 1606 repeats the computational operations associated with blocks 1607-1611 for each frequency/wavenumber window of the f-k domain of the transformed pressure and particle motion wavefields. In decision block 1607, when both pressure sensor response, $S_p$, and vertical velocity sensor response, $S_v$, are known of f-k domain, control flows to block 1608. Otherwise, control flows to block 1609. In block 1609, a routine "compute sensor response" is called to compute $S_p/S_v$, the pressure sensor response $S_p$, or the vertical velocity sensor response $S_v$ as described below. In block 1608, measured up-going pressure, vertical velocity (or vertical acceleration) is computed as described above with reference to Equation (19a) or (20a). In block 1609, measured down-going pressure or vertical velocity (or vertical acceleration) is computed as described above with reference to Equation (19b) or (20b). In decision block 1611, when another frequency/wavenumber window is available the computational operations represented by blocks 1607-1610 are repeated, otherwise, the method terminates.

Figure 17:
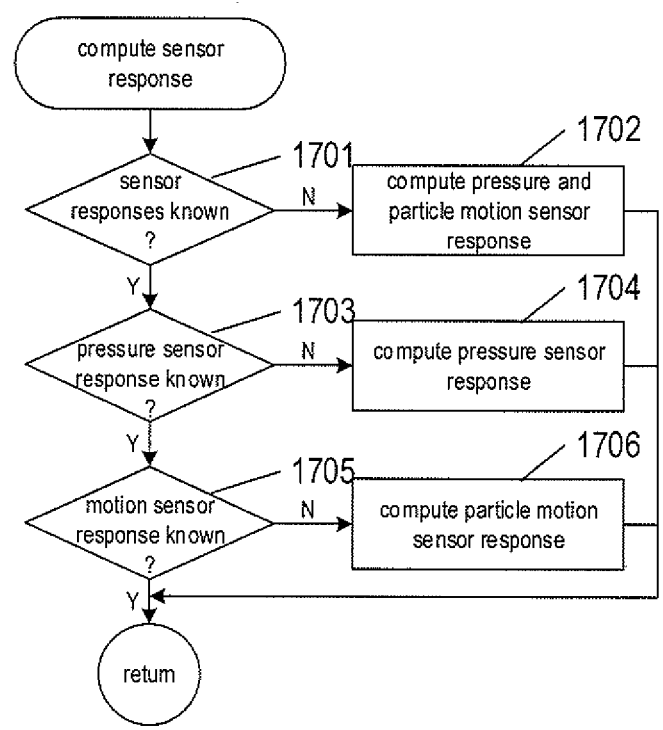
FIG. 17 shows a control-flow diagram that represents the routine "compute sensor response" called in FIG. 16.

FIG. 17 shows a control-flow diagram that represents the routine "compute sensor response" called in block 1609 of FIG. 16. In decision block 1701, when both the pressure sensor response, $S_p$, and the vertical velocity sensor response, $S_v$, are unknown, control flows to block 1702 in which the quantity, $S_p/S_v$, is computed according to Equation (17). Alternatively, if pressure spectrum or particle motion spectrum includes a notch, the quantity, $S_p/S_v$, is computed according to Equation (19). Otherwise, only one of the pressure sensor response $S_p$ or vertical velocity sensor response $S_v$ is broadband while the other is narrowband or unknown and control flows to decision block 1703. In decision block 1703, when the pressure sensor response is unknown, control flows to block 1704 in which the pressure sensor response is computed according to Equation (23). In decision block 1705, when the vertical velocity sensor response is unknown, control flows to block 1706 in which the vertical velocity sensor response computed according to Equation (22).

In an alternative implementation, the routine "compute sensor response" represented by FIG. 17 may also be executed when the particle motion sensors are accelerometers. In decision block 1701, when both the pressure sensor response, $S_p$, and the accelerometer sensor response, $S_a$, are unknown, control flows to block 1702 in which the quantity, $S_p/S_a$, is computed according to Equation (27). Alternatively, when the pressure spectrum or acceleration spectrum includes a notch, the quantity, $S_p/S_a$, is computed according to Equation (28). Otherwise, only one of the pressure sensor response $S_p$ or accelerometer sensor response $S_a$ is unknown and control flows to decision block 1703. In decision block 1703, when the pressure sensor response is unknown, control flows to block 1704 in which the pressure sensor response is computed according to Equation (31). In decision block 1705, when the accelerometer response is unknown, control flows to block 1706 in which the accelerometer response computed according to Equation (30).

Figure 18:
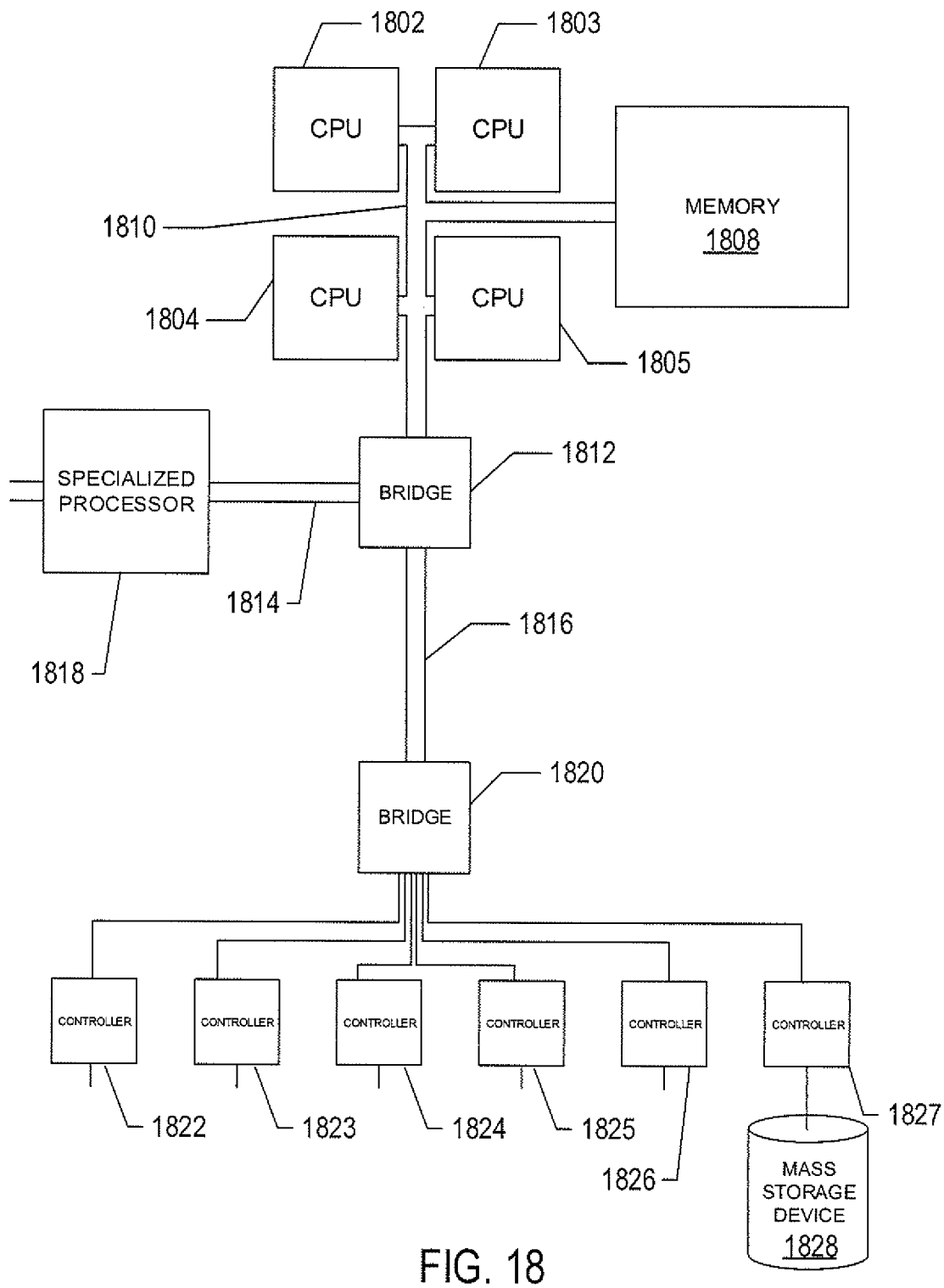
FIG. 18 shows an example of a generalized computer system that executes efficient methods for separating wavefields

FIG. 18 shows an example of a generalized computer system that executes efficient methods for separating wavefields described above and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. The busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1828 is a data-storage device, including electronic memory, optical or magnetic disk drive, USB drive, flash memory and other such data-storage device. The computer-readable medium 1828 can be used to store machine-readable instructions that encode the computational methods described above and can be used to store encoded data, during store operations, and from which encoded data can be retrieved, during read operations, by computer systems, data-storage systems, and peripheral devices.

The mathematical equations and gathers presented above are not, in any way, intended to mean or suggest an abstract idea or concept. Instead the mathematical equations and gathers described above represent actual physical and concrete concepts and properties of materials that are in existence. The mathematical equations and methods described above are ultimately implemented on physical computer hardware, data-storage devices, and communications systems in order to obtain results that also represent physical and concrete concepts of materials that are in existence. For example, as explained above, an actual pressure wavefield emanating from an actual subterranean formation after being illuminated with an acoustic signal is composed of actual physical pressure waves that are sampled using physical and concrete pressure and particle motion sensors. These sensors in turn produce physical electrical or optical signals that encode wavefield data that is physically recorded on data-storage devices and undergoes computational processing using hardware as describe above to obtain up-going wavefield data that represents physical and concrete up-going pressure and vertical velocity wavefields. The up-going wavefield data may be displayed, or subjected to further geophysical data processing, in order to interpret the physical structure and composition of the subterranean formation, such as in monitoring production of an actual hydrocarbon or mineral deposit within the subterranean formation.

The method described above may be implemented in real time while a survey is being conducted or subsequent to completion of the survey. The pressure and vertical velocity wavefields and up-going and down-going wavefields computed as described above form a geophysical data product indicative of certain properties of a subterranean formation. The geophysical data product may include processed seismic geophysical data and may be stored on a computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

It is appreciated that the above description of the described implementations is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the specific implementations described herein but is to be accorded the widest scope consistent with the principles and novel features disclosed herein.

The invention claimed is:

1. In a process for generating an image of a subterranean formation using marine seismic techniques in which pressure and particle motion wavefields reflected from the subterranean formation are measured by co-located pressure and particle motion sensors, the specific improvement comprising:
   computing a matching operator that relates the pressure sensor and the particle motion sensor responses of the co-located pressure and particle motion sensors based on pressure and particle motion wavefields;
   computing at least one of up-going pressure wavefield and up-going particle motion wavefield based on the matching operator and the measured pressure and particle motion wavefields; and
   using one of the up-going pressure wavefield and the up-going particle motion wavefield in generating an image of the subterranean formation without receiver ghost effects, thereby enhancing the image of the subterranean formation.

2. The process of claim 1 wherein the particle motion wavefield is a vertical velocity wavefield.

3. The process of claim 1 wherein the particle motion wavefield is a vertical acceleration wavefield.

4. The process of claim 1 wherein the matching operator further comprises a ratio of the pressure sensor response to the particle motion sensor response.

5. The process of claim 1 wherein the matching operator further comprises pressure and vertical velocity receiver ghosts based on the depths of the co-located pressure and particle motion sensors.

6. The process of claim 1 further comprising computing the particle motion sensor response based on the pressure sensor response when the particle motion sensor response is unknown.

7. The process of claim 1 further comprising computing the pressure sensor response based on the particle motion sensor response when the pressure sensor response is unknown.

8. The process of claim 1 executed on a programmable computer programmed to execute the method.

9. The process of claim 1 further comprising storing the up-going and down-going wavefields in one or more data-storage devices.

10. The process of claim 1, wherein the matching operators computed for co-located pressure and particle motion sensors form a geophysical data product, further comprising recording the geophysical data product on a physical, non-volatile computer-readable medium suitable for importing onshore.

11. The process of claim 10, further comprising performing geophysical analysis onshore on the geophysical data product.

12. The process of claim 1, wherein computing the matching operator further comprises computing an estimated matching operator.

13. The process of claim 1, wherein computing the matching operator further comprises computing an average estimated matching operator.

14. A computer system that performs wavefield separation, the system comprising:
   one or more processors;
   one or more data-storage devices; and
   a routine stored in one or more of data-storage devices that when executed by the one or more processors controls the system to carry out
      computing a matching operator that relates the pressure sensor and particle motion sensor responses of co-located pressure and particle motion sensors based on pressure and particle motion wavefields measured by the co-located pressure and particle motion sensors and depths of the co-located pressure and particle motion sensors;
      computing at least one of up-going pressure wavefield and up-going particle motion wavefield based on the matching operator and the measured pressure and particle motion wavefields; and
      using one of the up-going pressure wavefield and the up-going particle motion wavefield in generating an image of the subterranean formation without receiver ghost effects, thereby enhancing the image of the subterranean formation.

15. The system of claim 14 wherein the particle motion wavefield is a vertical velocity wavefield.

16. The system of claim 14 wherein the particle motion wavefield is a vertical acceleration wavefield.

17. The system of claim 14 wherein the matching operator further comprises a ratio of the pressure sensor response to the particle motion sensor response.

18. The system of claim 14 wherein the matching operator further comprises pressure and vertical velocity receiver ghosts based on the receiver depth.

19. The system of claim 14 further comprising computing the particle motion sensor response computed based on the pressure sensor response when the particle motion sensor response is unknown.

20. The system of claim 14 further comprising computing the pressure sensor response based on the particle motion sensor response when the pressure sensor response is unknown.

21. The system of claim 14, wherein computing the matching operator further comprises computing an estimated matching operator.

22. The system of claim 14, wherein computing the matching operator further comprises computing an average estimated matching operator.

23. A non-transitory computer-readable medium having machine-readable instructions encoded thereon for enabling one or more processors of a computer system to perform the operations of:
   computing a matching operator that relates the pressure sensor and particle motion sensor responses of co-located pressure and particle motion sensors based on pressure and particle motion wavefields measured by the co-located pressure and particle motion sensors and depths of the co-located pressure and particle motion sensors;
   computing at least one of up-going pressure wavefield and up-going particle motion wavefield based on the matching operator and the measured pressure and particle motion wavefield; and
   using one of the up-going pressure wavefield and the up-going particle motion wavefield in generating an image of the subterranean formation without receiver ghost effects, thereby enhancing the image of the subterranean formation.

24. The medium of claim 23 wherein the particle motion wavefield is a vertical velocity wavefield.

25. The medium of claim 23 wherein the particle motion wavefield is a vertical acceleration wavefield.

26. The medium of claim 23 wherein the matching operator further comprises a ratio of the pressure sensor response to the particle motion sensor response.

27. The medium of claim 23 wherein the matching operator further comprises pressure and vertical velocity receiver ghosts based on the receiver depth.

28. The medium of claim 23 further comprising computing the particle motion sensor response based on the pressure sensor response when the particle motion sensor response is unknown.

29. The medium of claim 23 further comprising computing the pressure sensor response based on the particle motion sensor response when the pressure sensor response is unknown.

30. The medium of claim 23, wherein computing the matching operator further comprises computing an estimated matching operator.

31. The medium of claim 23, wherein computing the matching operator further comprises computing an average estimated matching operator.

* * * * *